(12) United States Patent
Uchida

(10) Patent No.: US 9,246,811 B2
(45) Date of Patent: Jan. 26, 2016

(54) COMMUNICATION METHOD, COMMUNICATION DEVICE, AND COMMUNICATION SYSTEM

(71) Applicant: FUJITSU LIMITED, Kawasaki-shi, Kanagawa (JP)

(72) Inventor: Yoshihiro Uchida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 14/193,570

(22) Filed: Feb. 28, 2014

(65) Prior Publication Data

US 2014/0269722 A1 Sep. 18, 2014

(30) Foreign Application Priority Data

Mar. 18, 2013 (JP) ................................. 2013-054907

(51) Int. Cl.
*H04L 12/743* (2013.01)

(52) U.S. Cl.
CPC .................................. *H04L 45/7453* (2013.01)

(58) Field of Classification Search
None
See application file for complete search history.

(56) References Cited

U.S. PATENT DOCUMENTS

| 6,549,540 | B1 | 4/2003 | Ward |
| 7,349,430 | B1 * | 3/2008 | Chapman ...................... 370/468 |
| 2007/0098006 | A1 * | 5/2007 | Parry et al. ..................... 370/437 |

FOREIGN PATENT DOCUMENTS

| JP | 6-276230 | 9/1994 |
| JP | 2000-13439 | 1/2000 |
| JP | 2000-295249 | 10/2000 |

* cited by examiner

*Primary Examiner* — Frank Duong
*Assistant Examiner* — Feben M Haile
(74) *Attorney, Agent, or Firm* — Staas & Halsey LLP

(57) ABSTRACT

A communication method using link aggregation, the method includes receiving a transfer frame; calculating, by a first communication device, an identification number of an output port for the transfer frame among a plurality of ports using a hash function, by using a combination of a source address of the transfer frame, a destination address of the transfer frame, and a cyclic number that is generated for every combination of the source address and the destination address and represents an order of the transfer frame as a hash key; and transmitting the transfer frame from the output port.

16 Claims, 24 Drawing Sheets

FIG. 5A

| PREAMBLE (8) | SA (6) | DA (6) | TYPE (2) | DATA (46-1500) | FCS (4) |

FIG. 5B

| Pout (1) | PREAMBLE (8) | SA (6) | DA (6) | TYPE (2) | DATA (46-1500) | FCS (4) |

FIG. 5C

| Pin (1) | PREAMBLE (8) | SA (6) | DA (6) | TYPE (2) | DATA (46-1500) | FCS (4) |

FIG. 5D

| Ptr (1) | PREAMBLE (8) | SA (6) | DA (6) | TYPE (2) | DATA (46-1500) | FCS (4) |

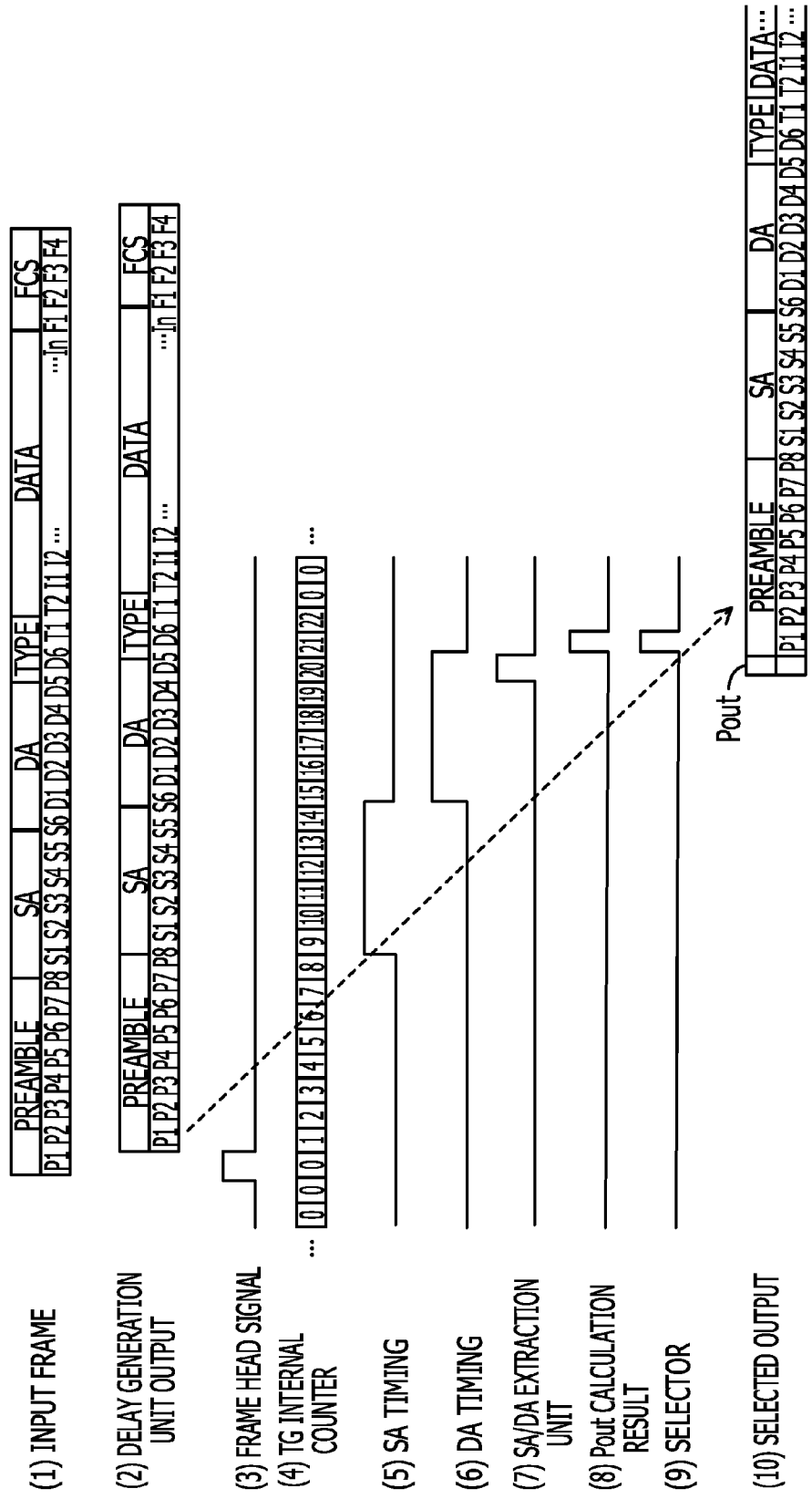

FIG. 7

| SA | DA | COUNT |
|---|---|---|
| xxxxxxxxxxx | yyyyyyyyyyy | 3 |
| xxxxxxxxxxx | zzzzzzzzzzz | 0 |
| ⋮ | ⋮ | ⋮ |

FIG. 8A

| HASH KEY | MD5 VALUE |
|---|---|
| 0A0B0C0D0E0F11223344556600 | 0x6120D100DB8B282B4F3315C76BA1DB06 |
| 0A0B0C0D0E0F11223344556601 | 0x8363A5E324D50EEFA0FA5B842D468E6A |
| 0A0B0C0D0E0F11223344556602 | 0xF6BD840578A6628C44F58BB15C7AA923 |
| 0A0B0C0D0E0F11223344556603 | 0x8BFD66878AA39A8291E1251137837E12 |

FIG. 8B

| SN | Poutx |
|---|---|
| 0 | 1 |
| 1 | 0 |
| 2 | 3 |
| 3 | 8 |

FIG. 9

| SA | DA | SN | Poutx |
|---|---|---|---|
| xxxxxxxxxx | yyyyyyyyyy | 0 | 4 |
| | | 1 | 1 |
| | | ⋮ | ⋮ |
| | | 9 | 2 |
| xxxxxxxxxx | zzzzzzzzzz | 0 | 8 |
| | | 1 | 0 |
| | | ⋮ | ⋮ |
| | | 9 | 5 |

FIG. 15

| SEQUENCE NUMBER | Pin |
|---|---|
| 0 | 1 |
| 1 | 0 |
| 2 | 3 |
| 3 | 8 |

FIG. 19

| INPUT FROM SYNCHRONIZATION DETERMINATION UNIT | | | STORAGE FLAG | OPERATION |
|---|---|---|---|---|
| Sync_state | Match_1 | Match_2 | | |
| OOS | d.c | d.c | d.c | DISCARD INPUTTED FRAME |
| IS | OK | d.c | 0 | OUTPUT INPUTTED FRAME |
| IS | OK | d.c | 1 | OUTPUT FRAME THAT IS IN BUFFER AFTER OUTPUTTING RECEIVED FRAME |
| IS | d.c | OK | d.c | WRITE INPUT FRAME INTO BUFFER |

COMMUNICATION METHOD, COMMUNICATION DEVICE, AND COMMUNICATION SYSTEM

CROSS-REFERENCE TO RELATED APPLICATION

This application is based upon and claims the benefit of priority of the prior Japanese Patent Application No. 2013-054907, filed on Mar. 18, 2013, the entire contents of which are incorporated herein by reference.

FIELD

The embodiment discussed herein is related to a communication method, a communication device, and a communication system.

BACKGROUND

Use of link aggregation enables bundled-manner handling of a plurality of physical lines (links) as a single logical line. For example, it is assumed that a communication device A and a communication device B are coupled with each other by ten physical lines having a band of 1 gigabits per second (Gbps). In this case, the ten lines which connect the communication device A and the communication device B may be dealt with as a single line of 10 Gbps.

As a related technique, a routing method for a case in which routers are directly coupled with each other with a plurality of connections has been disclosed. In this method, a router which receives a frame extracts one or a plurality of pieces of header information. Then, an output interface of the frame is decided by using the extracted information as a key. Therefore, frames having identical information serving as a key (identical flows) are outputted from the same interface, being able to avoid order reverse of frames.

Such method that a plurality of logical channels which designate a communication route are set between two nodes, and a transmission node divides transmission information into a plurality of frames and provides sequence numbers to respective frames so as to transmit the frames in a manner to distribute the frames to a plurality of logical channels has also been disclosed. A reception node synthesizes the frames which are transmitted in a manner to be distributed to a plurality of logical channels, by using the sequence numbers, thus restoring the transmitted information.

As related art, Japanese Laid-open Patent Publication No. 2000-13439, Japanese Laid-open Patent Publication No. 6-276230, and the like are disclosed, for example.

Even if a logical bandwidth is expanded by using the link aggregation, in a case in which a link used for transmission of a frame is uniquely decided by associating the link with a destination and a source of the frame, frames are outputted to an identical link when combinations of destinations and sources of the frames are the same as each other. Therefore, it is difficult to transmit a flow exceeding a bandwidth of a physical link even a flow which is able to be transmitted and received in a band narrower than a band which is logically obtained by the link aggregation. If it is possible to distribute frames which are included in a flow of the same combination of a destination and a source to a plurality of physical links, it is possible to transmit a flow equal to or larger than a bandwidth of a physical link. However, a usage condition varies depending on a physical link, so that order reverse of frames may occur. Further, in a case in which sequence numbers are provided to respective frames, a region for storing a sequence number is secured in each of the frames and therefore, a format of a frame transmitted from a terminal is changed. Thus, there is no versatility.

SUMMARY

According to an aspect of the invention, a communication method using link aggregation, the method includes receiving a transfer frame; calculating, by a first communication device, an identification number of an output port for the transfer frame among a plurality of ports using a hash function, by using a combination of a source address of the transfer frame, a destination address of the transfer frame, and a cyclic number that is generated for every combination of the source address and the destination address and represents an order of the transfer frame as a hash key; and transmitting the transfer frame from the output port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A, 5B, 5C, and 5D illustrate examples of a format of a frame;

FIG. 6 is a timing chart illustrating an example of processing which is performed in the interface circuit;

FIG. 7 illustrates an example of a sequence number counter;

FIGS. 8A and 8B illustrate a generation example of a hash key and a calculation example of an output port number respectively;

FIG. 9 illustrates an example of an association table between a sequence number and an output port;

FIG. 15 is a table illustrating an example of a relation between a sequence number and a reception port;

FIG. 19 is a table illustrating an example of processing which is performed by using the correction unit and a frame buffer;

DESCRIPTION OF EMBODIMENT

Figure 1:
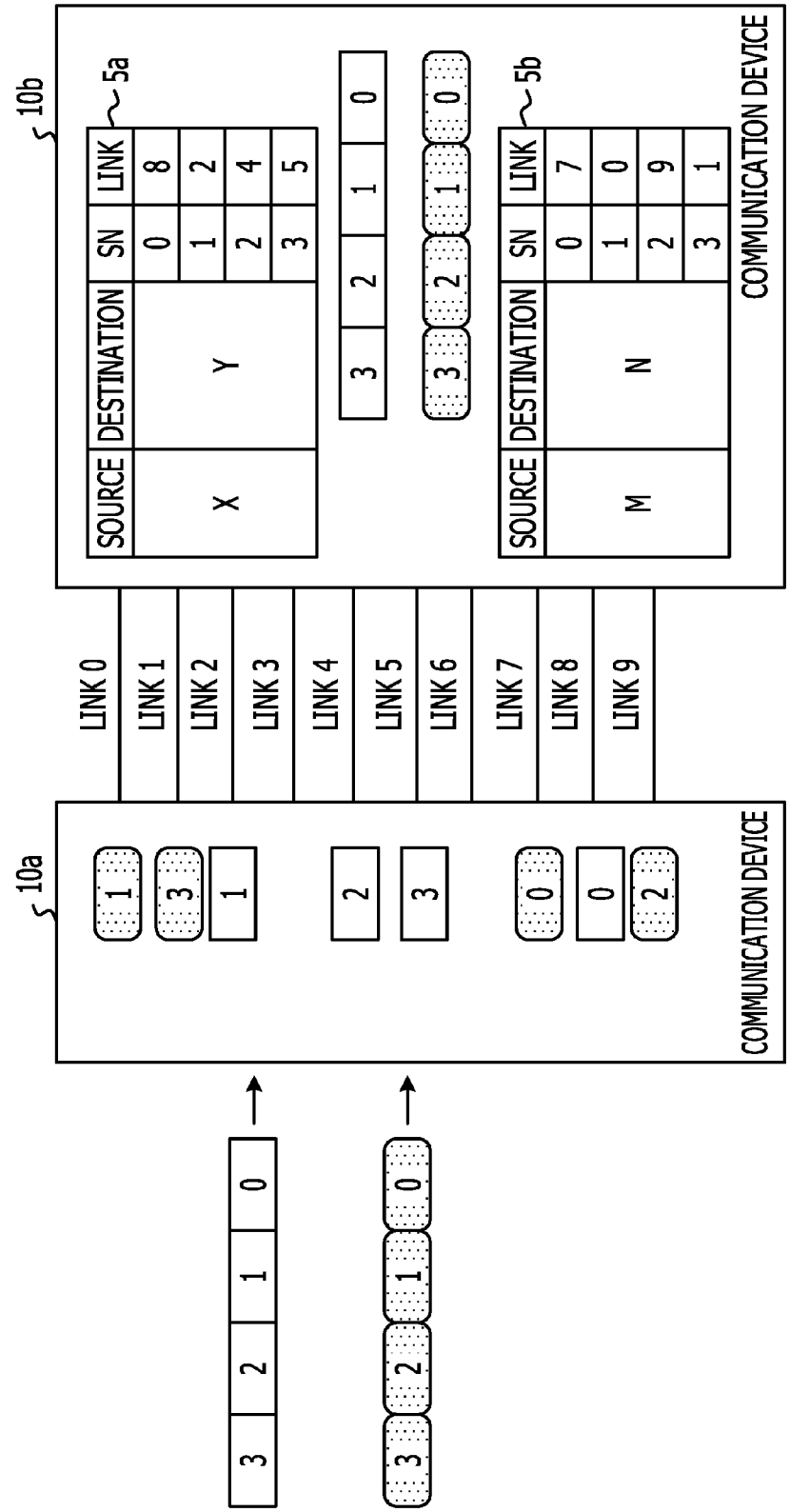
FIG. 1 illustrates an example of a communication method according to an embodiment.

FIG. 1 illustrates an example of a communication method according to an embodiment. Both a communication device 10a and a communication device 10b receive a frame from a terminal and transfer the received frame to a destination of the received frame. The communication device 10a and the communication device 10b are coupled with each other by ten physical links from link 0 to link 9. The links 0 to 9 are dealt with as a single logical link by the link aggregation. Further, numbers of ports which are used for communication between the communication device 10a and the communication device 10b are accorded with numbers of the links which are coupled to the ports respectively. In FIG. 1, the communication device 10a communicates with a terminal X and a terminal M. The communication device 10b communicates with a terminal Y and a terminal N. In FIG. 1, in order to make a combination of a source and a destination of each frame understandable, frames which are transmitted from the terminal X to the terminal Y are represented by white rectangles and frames which are transmitted from the terminal M to the terminal N are represented by rectangles having round corners and being stippled.

The communication device 10a generates a cyclic number (sequence number, SN) for every combination of a source and a destination. Therefore, as depicted in FIG. 1, sequence numbers are separately assigned to frames which are transmitted from the terminal X to the terminal Y and frames which are transmitted from the terminal M to the terminal N. Here, sequence numbers are decided so as to circulate in a range of predetermined specific values. In the example of FIG. 1, any of values from 0 to 3 is assigned as a sequence number with respect to each combination of a source and a destination. The communication device 10a obtains a number of a physical link by a hash function by using a combination of a source address, a destination address, and a sequence number as a key, for every frame. The communication device 10a outputs a frame to the communication device 10b through a physical link corresponding to the number obtained by using the hash function. In this case, a frame from the terminal X to the terminal Y is transmitted to the communication device 10b via the link 8 in a case of SN=0, via the link 2 in a case of SN=1, via the link 4 in a case of SN=2, and via the link 5 in a case of SN=3. A frame from the terminal M to the terminal N is transmitted to the communication device 10b via the link 7 in a case of SN=0, via the link 0 in a case of SN=1, via the link 9 in a case of SN=2, and via the link 1 in a case of SN=3.

The communication device 10b preliminarily holds a hash function which is used for calculation of a physical link by the communication device 10a, and the communication device 10b is capable of specifying a number of a physical link which is used for communication and a number of a reception port, for every combination of a source, a destination, and a sequence number of a frame, as depicted in FIG. 1. Therefore, the communication device 10b specifies a number of a port to which a frame is inputted for every combination of a source and a destination of a frame, so as to rearrange frames in their transmitted order. For example, the communication device 10b recognizes that the frames which are transmitted from the terminal X to the terminal Y are inputted from the link 8, the link 2, the link 4, and the link 5 in an order of the sequence numbers 0 to 3, on the basis of a calculation result illustrated on a table 5a. Accordingly, the communication device 10b transmits the frames addressed to the terminal Y from the terminal X as frames which are transmitted to the terminal Y in the following order: a received frame from the link 8, a received frame from the link 2, a received frame from the link 4, and a received frame from the link 5. In a similar manner, the communication device 10b transmits the frames addressed to the terminal N from the terminal M as frames which are transmitted to the terminal N in the following order: a received frame from the link 7, a received frame from the link 0, a received frame from the link 9, and a received frame from the link 1, on the basis of the table 5b.

Thus, the communication device 10 according to the embodiment is capable of specifying a transmitted order of frames which are transmitted in a manner to be divided into a plurality of physical links, by using a source, a destination, and an input port number of a frame. Therefore, the communication device 10 according to the embodiment is capable of avoiding an occurrence of order reverse of frames even if the communication device 10 transmits and receives frames by using a plurality of physical links. Accordingly, the communication device 10 is capable of relaying communication which is performed in a bandwidth exceeding a band of individual physical links as well. Further, in the method according to the embodiment, sequence numbers are not included in frames. Therefore, it is possible to relay communication of a bandwidth equal to or larger than a bandwidth of a physical link without changing a format of a frame which is used for transmission and reception between terminals.

Figure 2:
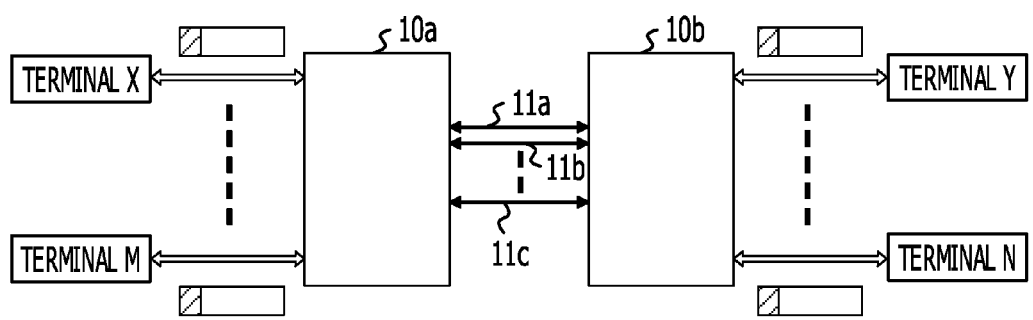
FIG. 2 illustrates an example of a network.

FIG. 2 illustrates an example of a network. A communication system includes the communication device 10a, the communication device 10b, and terminals. Four terminals which are the terminal X, the terminal Y, the terminal M, and the terminal N are illustrated in FIG. 2, but the number of terminals included in the network is arbitrary. The communication device 10a and the communication device 10b are directly coupled with each other via physical links 11 (11a to 11c). The physical links 11a to 11c are logically dealt with as a single link by the link aggregation. The number of physical links 11 is selected from arbitrary numbers equal to or larger than 2, depending on implementation.

Figure 3:
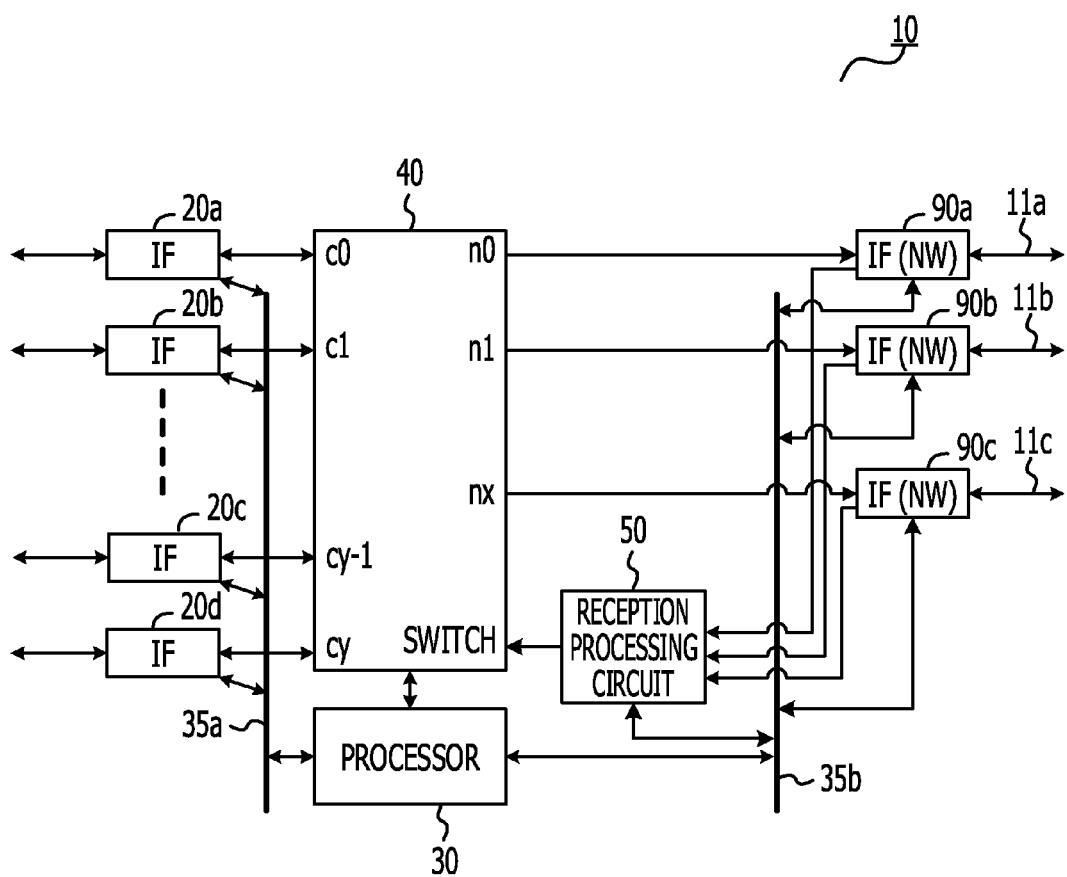
FIG. 3 illustrates an example of the configuration of a communication device.

FIG. 3 illustrates an example of the configuration of the communication device 10. The communication device 10 includes interface circuits (IFs) 20 (20a to 20d), a processor 30, buses 35 (35a, 35b), a switch 40, a reception processing circuit 50, and interface circuits 90 (90a to 90c). For the sake of easy discrimination between the interface circuits 20 and the interface circuits 90, the interface circuits 90 on the network side are denoted as IF (NW). The switch 40 includes ports on the terminal side (c0 to cy) and ports on the network side (n0 to nx). Hereinafter, when a port on the terminal side is represented, a port number assigned for the port is described following an alphabet c. For example, port 2 on the terminal side is denoted as c2. In a similar manner, when a port on the network side is represented, a port number assigned for the port is described following an alphabet n. For example, port 3 on the network side is denoted as n3. Here, it is assumed that the number of ports on the network side is equal to the number of the physical links 11. In the following description, it is assumed that a link number of the physical link 11 is equal to a number of a port which is used for output/input to the physical link 11. For example, a frame which is outputted to port 2 on the network side (n2) by the communication device 10a is transmitted to the communication device 10b via the link 2.

The interface circuit 20 transmits and receives a frame to and from a terminal. The interface circuit 20 decides a port on the network side from which a frame received from a terminal is to be outputted. The interface circuit 20 outputs the frame with information for identifying an output port of the frame to the switch 40. The switch 40 outputs the frame from a port on the network side in accordance with the information notified by the interface circuit 20. As a result, the frame is transmitted to the communication device 10 on the reception side via the interface circuit 90 which is coupled to the output port on the network side of the communication device 10 on the transmission side.

The processor 30 performs processing related to management and operation of the communication device 10. The interface circuit 90 transmits and receives a frame via the physical link 11. The interface circuit 90 outputs a received frame to the reception processing circuit 50. The reception processing circuit 50 rearranges received frames in their transmitted order. The reception processing circuit 50 determines whether or not the communication device 10 on the transmission side is synchronized with the communication device 10 on the reception side. Further, in accordance with a destination of a frame, the reception processing circuit 50 outputs, to the switch 40, information of the terminal-side port that is an output destination of the frame, together with the received frame. The switch 40 outputs the received frame from a port on the terminal side to the interface circuit 20 in accordance with the information notified from the reception processing circuit 50.

Processing performed in the interface circuit 20, the switch 40, and the reception processing circuit 50 will be described later. The bus 35a connects the interface circuits 20, the switch 40, and the processor 30 so as to enable mutual delivery of data. The bus 35b connects the interface circuits 90, the reception processing circuit 50, and the processor 30 so as to enable mutual delivery of data.

Hereinafter, transmission processing which is performed in the communication device 10 is described in detail by taking a case in which the communication device 10a transmits a frame which is received from a terminal to the communication device 10b, as an example.

Figure 4:
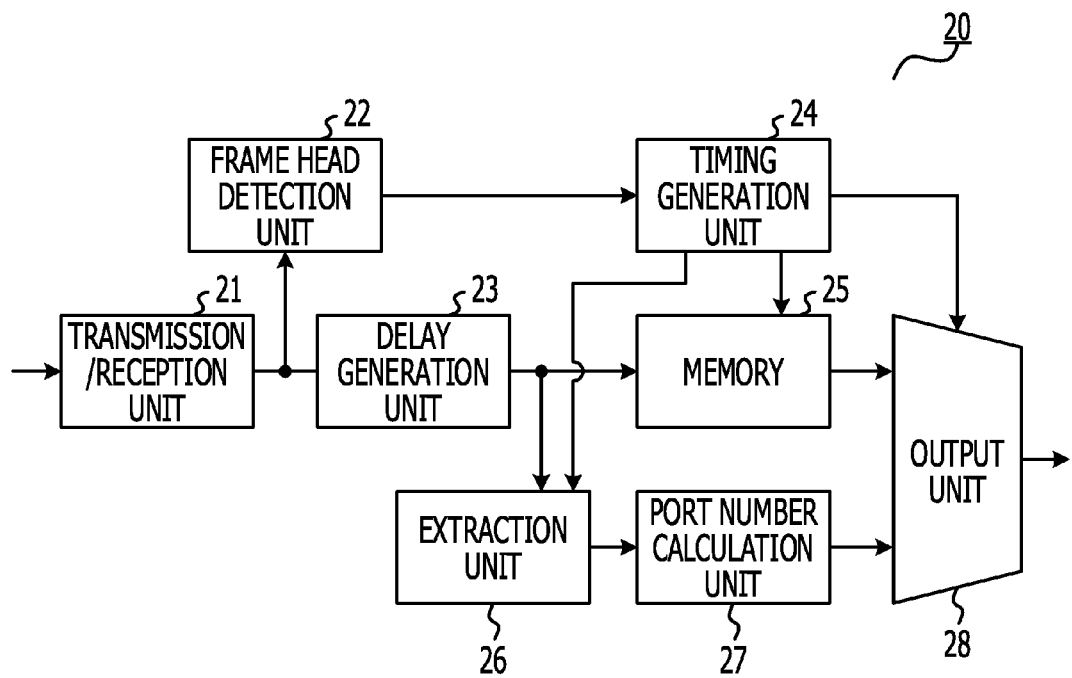
FIG. 4 illustrates an example of the configuration of an interface circuit.

FIG. 4 illustrates an example of the configuration of the interface circuit 20. The interface circuit 20 includes a transmission/reception unit 21, a frame head detection unit 22, a delay generation unit 23, a timing generation unit 24, a memory 25, an extraction unit 26, a port number calculation unit 27, and an output unit 28. The transmission/reception unit 21, the frame head detection unit 22, the delay generation unit 23, the timing generation unit 24, the memory 25, the extraction unit 26, the port number calculation unit 27, and the output unit 28 may be formed by hardware respectively. When the interface circuit 20 is provided with a processor, the processor may operate as the frame head detection unit 22, the delay generation unit 23, the timing generation unit 24, the extraction unit 26, and the port number calculation unit 27.

The transmission/reception unit 21 terminates a line between a terminal and the communication device 10 and transmits/receives a frame to/from the terminal. The transmission/reception unit 21 outputs a frame received from a terminal to the frame head detection unit 22 and the delay generation unit 23. When the frame head detection unit 22 detects a head of a frame, the frame head detection unit 22 notifies the timing generation unit 24 of the detection of the head of the frame. The timing generation unit 24 holds a counter thereinside. The timing generation unit 24 measures timing at which a frame or information is inputted into the memory 25, the extraction unit 26, and the output unit 28, by using the counter. The timing generation unit 24 uses time at which the timing generation unit 24 receives the notification from the frame head detection unit 22, as a reference of measurement of timing. Examples of a signal outputted by the timing generation unit 24 and timing will be described later.

The delay generation unit 23 adds predetermined delay to a frame inputted from the transmission/reception unit 21 and outputs the frame to the memory 25 and the extraction unit 26. The memory 25 holds a frame received from the delay generation unit 23 and outputs the held frame to the output unit 28 at timing notified from the timing generation unit 24. Therefore, the memory 25 may be realized by a dual-port memory. The extraction unit 26 extracts a source address and a destination address from a frame received from the delay generation unit 23 and outputs the source address and the destination address to the port number calculation unit 27. The extraction unit 26 generates a sequence number in a manner to associate the sequence number with a source address and a destination address of a frame and outputs the sequence number to the port number calculation unit 27. The port number calculation unit 27 preliminarily stores a hash function. The port number calculation unit 27 calculates a port number on the network side of an output destination by a hash function by using a combination of a source address, a destination address, and a sequence number, as a key. Thus, it may be said that the port number calculation unit 27 selects an output port of a frame among ports on the network side. The way of obtaining a port number will be described later. The port number calculation unit 27 outputs an obtained calculation result to the output unit 28. The output unit 28 outputs inputted information and frame to the switch 40.

FIGS. 5A, 5B, 5C, and 5D illustrate examples of a format of a frame. FIG. 6 is a timing chart illustrating an example of processing which is performed in the interface circuit 20. An example of an operation of the communication device 10a on the transmission side is described below by taking a case in which a frame depicted in FIG. 5A is transmitted from the terminal X to the communication device 10a, as an example. The following numbers of procedures correspond to numbers depicted in FIG. 6.

(1) The transmission/reception unit 21 of the communication device 10a receives a frame of the format depicted in FIG. 5A. The frame depicted in FIG. 5A includes a preamble, a source address (SA), a destination address (DA), a type, data, and frame check sequence (FCS), from the head. In FIGS. 5A to 5D, numbers written in parentheses denote a length of each piece of information by a byte unit. The transmission/reception unit 21 outputs the received frame to the delay generation unit 23 and the frame head detection unit 22. To the frame head detection unit 22 and the delay generation unit 23, the frame is inputted at timing depicted in (1) of FIG. 6.

(2) The delay generation unit 23 delays timing of the frame received from the frame head detection unit 22 by predetermined time. In the following description, it is assumed that the delay generation unit 23 generates delay of 1 byte with respect to an inputted frame. The delay generation unit 23 outputs the delayed frame to the memory 25 and the extraction unit 26. Accordingly, the frame is inputted into the memory 25 and the extraction unit 26 at timing depicted in (2) of FIG. 6.

(3) The frame head detection unit 22 detects a head of the frame received from the transmission/reception unit 21. When the frame head detection unit 22 detects the head of the frame, the frame head detection unit 22 generates a pulse signal (frame head display pulse) at timing when 1 byte of the head of the preamble of the frame is inputted. The frame head detection unit 22 outputs the frame head display pulse to the timing generation unit 24.

(4) The timing generation unit 24 initializes a count value of the counter (count value=0) and stands by until the frame head display pulse is inputted from the frame head detection unit 22. When the frame head display pulse is inputted, the timing generation unit 24 starts count-up of the counter value. The timing generation unit 24 increments the count value by 1 at timing of falling of the frame head display pulse. Then, the timing generation unit 24 further increments the count value at timing when the frame is read by 1 byte. Accordingly, the count value of the timing generation unit 24 is accorded with the number of bytes of the frame which is read in the memory 25 and the extraction unit 26. The timing generation unit 24 continues count-up from time at which the head of the frame is detected to time at which the memory 25 starts to output the frame to the output unit 28.

(5) When the count value becomes 8, the timing generation unit 24 determines that reading of the preamble in the extraction unit 26 is finished. Then, the timing generation unit 24 outputs a pulse representing that a source address is inputted, to the extraction unit 26, from a count value 9 to a count value 14. Hereinafter, a pulse which represents that a source address is inputted may be referred to as a "SA timing pulse". The extraction unit 26 extracts values which are inputted from rising to falling of the SA timing pulse, as source addresses of frames.

(6) When the count value becomes 14, the timing generation unit 24 determines that reading of the source address in the extraction unit 26 is finished. Then, the timing generation unit 24 outputs a pulse representing that a destination address is inputted, to the extraction unit 26, from a count value 15 to a count value 20. Hereinafter, a pulse which represents that a destination address is inputted may be referred to as a "DA timing pulse". The extraction unit 26 extracts values which are inputted from rising to falling of the DA timing pulse, as destination addresses of frames.

(7) The extraction unit 26 counts the number of transmitted frames in a manner to associate the number of frames with a combination of a source address and a destination address. FIG. 7 illustrates an example of a sequence number counter. The extraction unit 26 preliminarily holds the minimum value and the maximum value of a sequence number. When receiving a frame, the extraction unit 26 increments a counter value which is associated with a source address and a destination address of the received frame, by 1. Regarding a combination of a source address and a destination address for which a count value is the maximum value of the sequence number, when the extraction unit 26 next receives a frame which has the same source address and destination address, the extraction unit 26 changes the sequence number to the minimum value. For example, in a case in which the extraction unit 26 holds a counter depicted in FIG. 7 and sequence numbers are 0 to 3, when receiving a frame of which a source address=xxxxxxxxxxxxxxxx and a destination address=yyyyyyyyyyyy, the extraction unit 26 sets a corresponding count value to 0. The extraction unit 26 uses a count value represented by a sequence number counter, as a sequence number.

When finishing extraction of a source address and a destination address, the extraction unit 26 generates a hash key by using the source address, the destination address, and the sequence number. A hash key is obtained as a sequence in which a destination address, a source address, and the sequence number are linked in this order, for example. A generation example of a hash key when source address: 0x112233445566,
destination address: 0x0A0B0C0D0E0F, and
range of sequence number: 00 to 03 is illustrated on the left column of FIG. 8A. In the left column of FIG. 8A, hash keys are illustrated in an order of sequence numbers 00, 01, 02, and 03 from the top. The extraction unit 26 outputs the obtained hash key to the port number calculation unit 27. Timing at which the extraction unit 26 outputs the hash key to the port number calculation unit 27 may be timing parallel with reading of the last 1 byte of a destination address, as depicted in FIG. 6.

(8) The port number calculation unit 27 processes the hash key by a hash function which is preliminarily stored. In the following example, the port number calculation unit 27 performs calculation using a message digest algorithm 5 (MD5). The port number calculation unit 27 performs the MD5 calculation with respect to a hash key so as to generate a digest of 128 bits. The right column of FIG. 8A illustrates an example of a digest (MD5 value) which is obtained when the hash key on the left column of FIG. 8A is used.

Then, the port number calculation unit 27 obtains a remainder which is obtained by dividing the obtained digest by the number of ports on the network side which are included in the switch 40. When an MD5 value corresponding to a sequence number=x is denoted as Mx and the number of output ports is n which is from 0 to n−1, a number Poutx of a port which outputs an input frame of which the sequence number=x is obtained from the following formula.

$$Poutx = Mx \bmod n$$

Here, mod denotes a remainder function. FIG. 8B illustrates numbers of output ports which are obtained with respect to the values depicted in FIG. 8A when a total number n of output ports is 10.

When finishing calculation of an output port number, the port number calculation unit 27 outputs a calculation result to the output unit 28 at predetermined timing which is decided on the basis of time at which a hash key is inputted as a reference. In the example of FIG. 6, the port number calculation unit 27 acquires a hash key at a count value in the timing generation unit 24=20. Then, the port number calculation unit 27 outputs the output port number to the output unit 28 at a count value=21.

(9) The timing generation unit 24 notifies the output unit 28 of timing at which the port number calculation unit 27 outputs the calculation result to the output unit 28. The output unit 28 includes a selector thereinside. The output unit 28 adjusts the selector thereinside so as to be able to receive an output from the port number calculation unit 27 at timing of the notification from the timing generation unit 24. Further, when an input of a port number from the port number calculation unit 27 is finished, the output unit 28 adjusts the selector again so as to be able to receive an output from the memory 25. In the example of FIG. 6, the port number calculation unit 27 outputs a port number as information of 1 byte to the output unit 28. Accordingly, the output unit 28 receives an input from the port number calculation unit 27 during a counter value of the timing generation unit 24=21. When the counter value of the timing generation unit 24 becomes 22, the output unit 28 receives an input from the memory 25.

(10) The timing generation unit 24 notifies the memory 25 of timing at which the port number calculation unit 27 finishes to output the port number obtained by calculation to the output unit 28, so as to promote output of the frame. Therefore, regarding a frame outputted from the output unit 28 to the switch 40, the first 1 byte is an output port number of the frame (Pout) and second and following bytes are the frame which is received by the communication device 10 from a terminal. An example of a format of a frame which is obtained in the output unit 28 is illustrated in FIG. 5B.

(11) The output unit 28 outputs the obtained frame to the switch 40. Processing of procedures (1) to (10) is described with reference to FIG. 3 on the assumption that the processing of the procedures (1) to (10) is performed in the interface circuit 20a, for example. In this case, a frame is outputted to the port of c0 of the switch 40. When acquiring the frame from the interface circuit 20, the switch 40 outputs the frame to a port on the network side to which the same number as a value represented by the first 1 byte of the frame is assigned. For example, in the table depicted in FIG. 8B, the output port number of a frame of a sequence number=0 is Pout=1, so that the first byte of the frame represents 1. Accordingly, the switch 40 outputs the frame of the sequence number=0 to the port of n1.

(12) The interface circuit 90b acquires the frame from the switch 40. Then, the interface circuit 90b deletes 1 byte of the head and transmits the frame to the communication device 10b via the physical link 11b.

FIG. 9 illustrates an example of an association table of a sequence number and an output port. The port number calculation unit 27 is capable of storing a result obtained by calculation, as an association table. Though the processing of one set among combinations of source addresses and destination addresses has been described in the procedures (1) to (12) so as to simplify the description, output ports may be calculated for a plurality of combinations of addresses in parallel. Therefore, the port number calculation unit 27 is capable of storing association between a sequence number and an output port in a manner to associate the association with a combination of a source address and a destination address, as depicted in FIG. 9.

Figure 10:
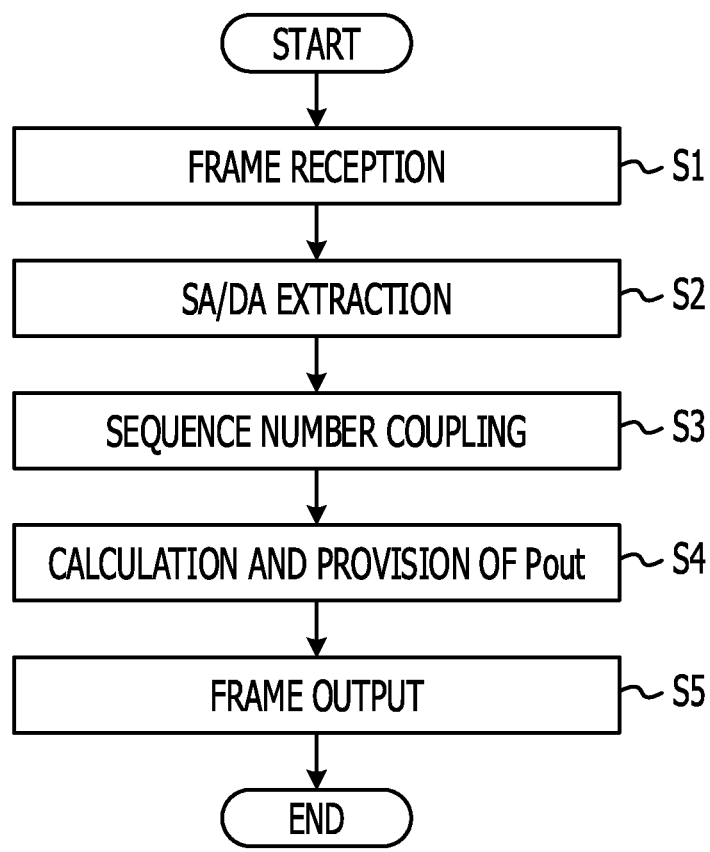
FIG. 10 is a flowchart illustrating an example of processing in the interface circuit.

FIG. 10 is a flowchart illustrating an example of processing in the interface circuit 20. The transmission/reception unit 21 receives a frame (S1). Subsequently, the extraction unit 26 extracts a source address and a destination address of the frame in accordance with timing notified by the timing generation unit 24 (S2). The extraction unit 26 combines a sequence number with the source address and the destination address so as to generate a hash key (S3). The extraction unit 26 outputs the hash key to the port number calculation unit 27. The port number calculation unit 27 calculates a number of an output port (Pout) by using a hash function. Then, the port number calculation unit 27 outputs the obtained Pout to the output unit 28 (S4). The memory 25 outputs the frame to the output unit 28 at timing designated by the timing generation unit 24 (S5). Through the processing illustrated in FIG. 10, a frame holding Pout on the first 1 byte, as depicted in FIG. 5B, is outputted to the switch 40.

Reception processing performed in the communication device 10 is described below in detail by taking processing of a case in which the communication device 10b receives a frame from the communication device 10a, as an example. The communication device 10b receives a frame outputted from the communication device 10a through a port of the interface circuit 90. In the communication device 10, one interface circuit 90 is disposed for every port on the network side which is provided to the communication device 10. Here, a port number is assigned to a port to which each interface circuit 90 is coupled. In the description below, a port number of a port to which the interface circuit 90 is coupled has the same value as a number of the physical link 11 which is coupled to the port.

The interface circuit 90 of the communication device 10b terminates a line and acquires a frame received from the communication device 10a. At this time, a frame received by the interface circuit 90 is a frame which is transmitted from the communication device 10a on the transmission side, so that a format thereof is as the one depicted in FIG. 5A. The interface circuit 90 adds a port number of the interface circuit 90 to the head of the received frame. Hereinafter, a port number of a port on the network side which receives a frame may be denoted as "Pin". An adding method of a port number performed in the interface circuit 90 is similar to processing which is performed for adding Pout in transmission processing in the interface circuit 20. A port number is represented by 1 byte. A format of a frame to which a port number Pin is added in the interface circuit 90 is depicted in FIG. 5C. The interface circuit 90 outputs the frame to which the port number Pin is added to the reception processing circuit 50.

Figure 11:
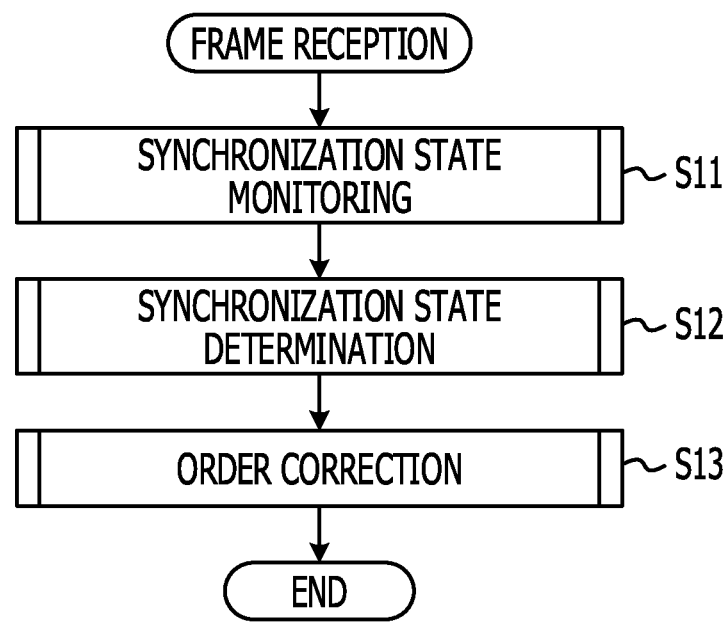
FIG. 11 is a flowchart illustrating an example of an operation of a reception processing circuit which has received a frame.

FIG. 11 is a flowchart illustrating an example of an operation of the reception processing circuit 50 which has received a frame. The reception processing circuit 50 of the communication device 10b first counts the number of times of correct prediction of a port number of a port which receives a frame, so as to determine whether or not the communication device 10a and the communication device 10b are synchronized with each other (S11). Subsequently, the reception processing unit 50 determines whether or not the number of times of correct prediction of a port number of a port which receives a frame exceeds a threshold value so as to determine whether or not the communication device 10a and the communication device 10b are synchronized with each other (S12). When the communication device 10a and the communication device 10b are synchronized with each other, the reception processing circuit 50 outputs the received frame to the switch 40. At this time, when order reverse of frames occurs, the reception processing circuit 50 corrects the order of frames to a correct order and outputs the frame to the switch 40 (S13).

Figure 12:
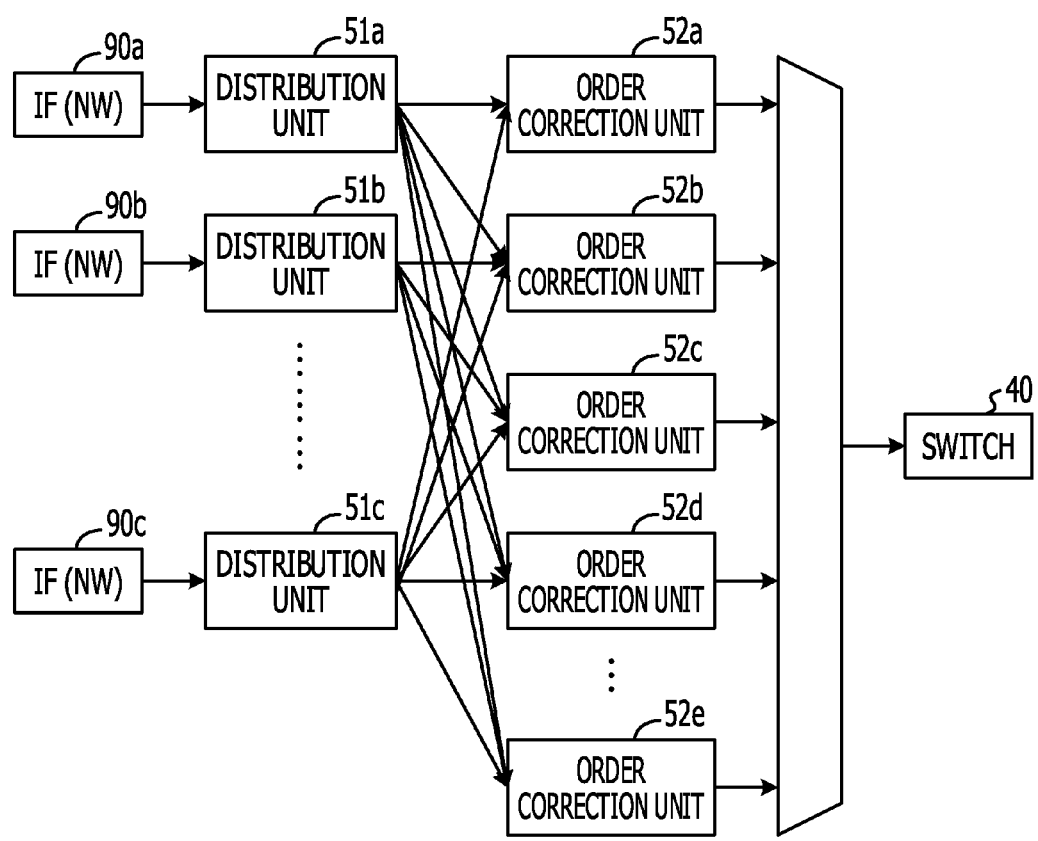
FIG. 12 illustrates an example of the configuration of the reception processing circuit.

FIG. 12 illustrates an example of the configuration of the reception processing circuit 50. The reception processing circuit 50 includes distribution units 51 (51a to 51c) and order correction units 52 (52a to 52e). In the example of FIG. 12, three distribution units 51 which are the distribution units 51a to 51c are illustrated, but the communication device 10 includes as many distribution units 51 as ports on the network side. The number of order correction units 52 is the same as the number of combinations of source addresses and destination addresses for frames which are processed by the communication device 10b.

Each of the distribution units 51 acquires a frame including a port number Pin from one interface circuit 90. The distribution unit 51 acquires a source address and a destination address of the acquired frame. Then, the distribution unit 51 outputs a frame to an order correction unit 52 which corresponds to a combination of a source address and a destination address. The frame outputted from the distribution unit 51 is processed in one order correction unit 52 for each combination of a source address and a destination address.

Figure 13:
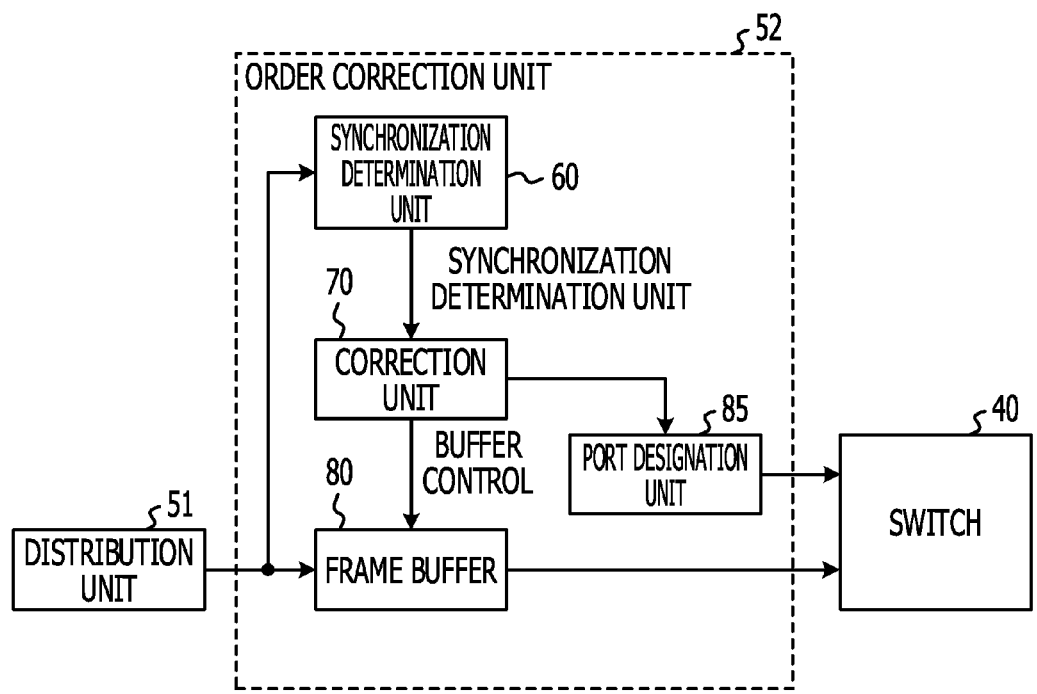
FIG. 13 illustrates an example of the configuration of an order correction unit.

FIG. 13 illustrates an example of the configuration of the order correction unit 52. The order correction unit 52 includes a synchronization determination unit 60, a correction unit 70, a frame buffer 80, and a port designation unit 85. A frame outputted from the distribution unit 51 is inputted into the synchronization determination unit 60 and the frame buffer 80. The synchronization determination unit 60, the correction unit 70, the frame buffer 80, and the port designation unit 85 may be respectively formed by hardware. When a processor is included in the reception processing circuit 50, the processor may realize the distribution unit 51, the synchronization determination unit 60, the correction unit 70, and the port designation unit 85.

The synchronization determination unit 60 determines whether or not the communication device 10b is in a state that the communication device 10b is able to correctly predict an order of frames transmitted from the communication device 10a for a combination of a source address and a destination address of a processing object. In the description below, a state in which the communication device 10b is in a state that the communication device 10b is able to correctly predict an order of frames transmitted from the communication device 10a on the transmission side may be represented such that the communication device 10a and the communication 10b are synchronized with each other. A synchronized state may be denoted as in sync "IS". Further, a state of out-of-synchronization may be denoted as out of sync "OOS". A determination method for synchronization will be described later.

The synchronization determination unit 60 notifies the correction unit 70 of a determination result of whether or not the communication device 10a and the communication device 10b are synchronized with each other. When the communication device 10a and the communication 10b are synchronized with each other, the correction unit 70 performs processing for correcting frames in an order transmitted from a terminal. The correction unit 70 corrects frames in accordance with the transmitted order by using a port number Pin which is added to the head of the frames. Accordingly, the correction unit 70 corrects the order of frames when order reverse of frames occurs. The correction unit 70 outputs a control signal to the frame buffer 80 so as to allow the frame buffer 80 to store the second and succeeding bytes of the inputted frame. The frame buffer 80 stores the second and succeeding bytes of the frame in accordance with the signal from the correction unit 70. Further, the frame buffer 80 outputs a stored frame to the switch 40 in accordance with a signal from the correction unit 70. The correction unit 70 also instructs the port designation unit 85 on timing of output.

The correction unit 70 outputs a control signal to the port designation unit 85 in a manner to adjust timing so as to be able to add information of 1 byte to the head of a frame outputted from the frame buffer 80. A control method of timing here is performed in a similar manner to a case in which a Pout is added to a head of a frame in transmission. The port designation unit 85 holds a number of a port (Ptr), corresponding to a destination address, of an output destination of a frame. The port designation unit 85 outputs, to the switch 40, the number of the port which is an output destination of the frame, as information of 1 byte, in accordance with the control signal from the correction unit 70. Subsequent to the information outputted from the port designation unit 85, a frame read out from the frame buffer 80 is outputted to the switch 40. Therefore, the input frame depicted in FIG. 5C is converted into a frame depicted in FIG. 5D through processing of the correction unit 70, the frame buffer 80, and the port designation unit 85. The processing of the correction unit 70 and the like will be described later in detail.

Figure 14:
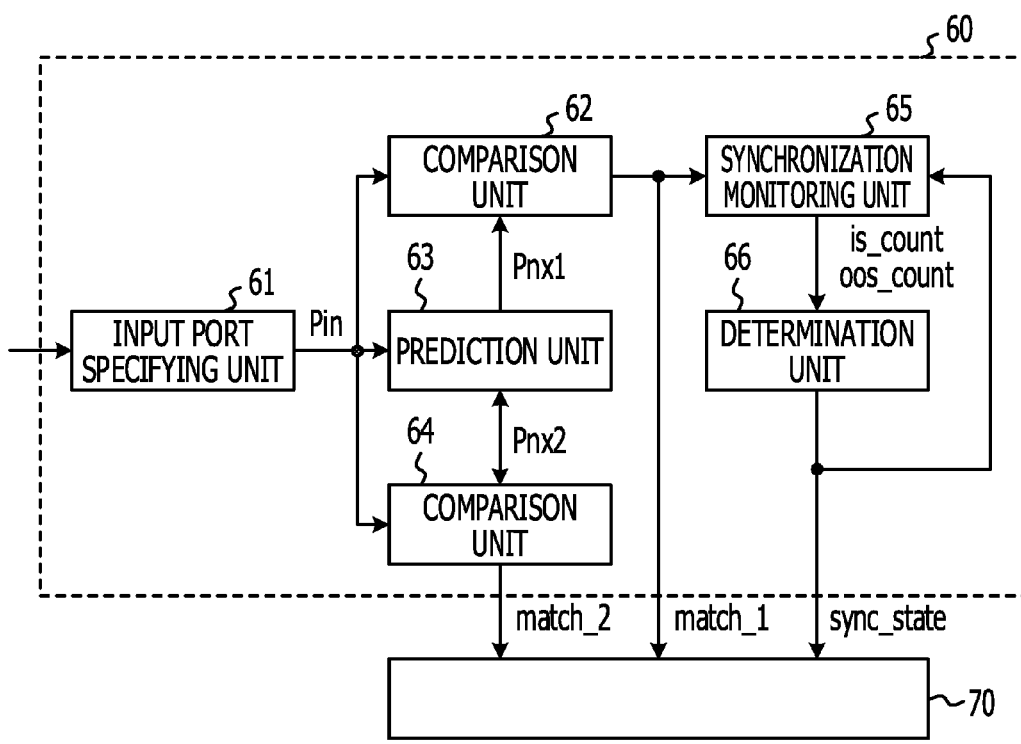
FIG. 14 illustrates an example of a synchronization determination unit.

FIG. 14 illustrates an example of the synchronization determination unit 60. The synchronization determination unit 60 includes an input port specifying unit 61, a comparison unit 62, a prediction unit 63, a comparison unit 64, a synchronization monitoring unit 65, and a determination unit 66. FIG. 14 illustrates an example of the synchronization determination unit 60 provided to the communication device 10 which is capable of correcting reverse of orders of two successive frames.

The input port specifying unit 61 acquires 1 byte of the head of a frame which is inputted into the synchronization determination unit 60 and outputs the obtained value to the comparison unit 62, the prediction unit 63, and the comparison unit 64. That is, the input port specifying unit 61 outputs a port number (Pin) of a port on the network side which has received an inputted frame to the comparison unit 62, the prediction unit 63, and the comparison unit 64.

Figure 15:
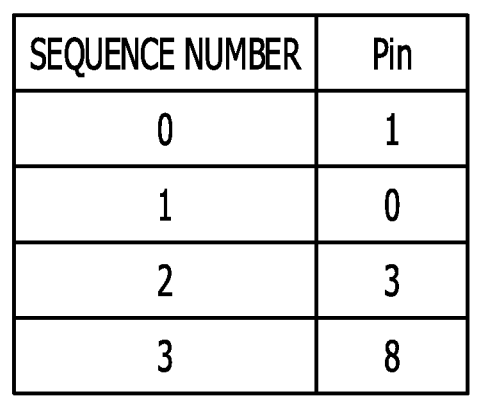

The prediction unit 63 stores a hash function which is used in the communication device 10a on the transmission side. The prediction unit 63 generates a hash key by using a source address, a destination address, and a sequence number having a potential to be used in communication. The prediction unit 63 performs calculation by using a hash key and a hash function. Then, the prediction unit 63 performs the same calculation processing as that of the communication device 10a on the transmission side with respect to a value of an obtained result so as to obtain a prediction value of a reception port (Pin) for every sequence number. FIG. 15 illustrates an example of a relation between a sequence number of a frame and a reception port (Pin). FIG. 15 illustrates an example of a relation between a sequence number of a frame and a reception port (Pin) when a source address=0x112233445566, a destination address=0x0A0B0C0D0E0F, and a range of a sequence number is 00 to 03. The prediction unit 63 specifies a sequence number of a frame which is currently inputted, on the basis of a value notified by the input port specifying unit 61. The prediction unit 63 outputs a port number (Pnx1) of a port predicted to receive a frame having a sequence number which is larger than a specified sequence number by 1, to the comparison unit 62. The prediction unit 63 outputs a port number (Pnx2) of a port which is predicted to receive a frame having a sequence number which is larger than a specified sequence number by 2, to the comparison unit 64. When the comparison unit 64 obtains an accorded result, the prediction unit 63 does not update values of Pnx1 and Pnx2. Here, the prediction unit 63 holds an order reverse flag. An order reverse flag=1 represents that the prediction unit 63 has not outputted a new port number to the comparison unit 62 and the comparison unit 64 due to reverse of an order of received frames. An order reverse flag=0 represents that values of Pnx1 and Pnx2 have been updated due to no occurrence of order reverse of received frames.

The comparison unit 62 and the comparison unit 64 hold values inputted from the prediction unit 63. The comparison unit 62 compares a value notified as a reception port number (Pin) of a frame by the input port specifying unit 61 with a value (Pnx1) inputted from the prediction unit 63 in previous processing of a frame. In other words, the comparison unit 62 determines whether or not prediction of a reception port of a frame is successful. Determination of Pin=Pnx1 in the comparison unit 62 represents that prediction of a reception port of a frame is correct.

On the other hand, the comparison unit 64 compares a value notified as a reception port number (Pin) of a frame by the input port specifying unit 61 with a value (Pnx2) inputted from the prediction unit 63 in previous processing of a frame. In other words, the comparison unit 64 determines whether or not reverse of the order between a received frame and a frame to be received next has occurred. Determination of Pin=Pnx2 in the comparison unit 64 represents that order reverse of frames has occurred.

The comparison unit 62 is notified of a port number of a port which is predicted to receive a frame of a sequence number=0, as an initial value, from the prediction unit 63. On the other hand, the comparison unit 64 is notified of a port number of a port which is predicted to receive a frame of a sequence number=1. The comparison unit 62 outputs a comparison result to the synchronization monitoring unit 65 and the correction unit 70. The comparison unit 64 outputs a comparison result to the prediction unit 63 and the correction unit 70. Hereinafter, a comparison result obtained in the comparison unit 62 is denoted as match_1 and a comparison result obtained in the comparison unit 64 is denoted as match_2. A case of an accorded comparison result is denoted as "OK" and a case of a disaccord comparison result is denoted as "NG".

For example, it is assumed that the prediction unit 63 has notified the comparison unit 62 and the comparison unit 64 of Pnx1=1 and Pnx2=0 respectively, by using FIG. 15. It is assumed that a port number for a frame first inputted into the synchronization determination unit 60 is Pin=1. Then, the input port specifying unit 61 notifies each of the comparison unit 62, the prediction unit 63, and the comparison unit 64 of Pin=1. Therefore, both Pin and Pnx1 are 1 for the first frame, so that the comparison unit 62 determines that Pin is accorded with Pnx1. The comparison unit 62 outputs match_1=OK to the synchronization monitoring unit 65 and the correction unit 70. On the other hand, Pin=1 and Pnx2=0 are set for the first frame, so that the comparison unit 64 determines that Pin is not accorded with Pnx2. The comparison unit 64 outputs match_2=NG to the prediction unit 63 and the correction unit 70. Since match_2=NG is obtained, the prediction unit 63 predicts new Pnx1 and Pnx2. The prediction unit 63 estimates that a sequence number of a frame inputted from a port of Pin=1 is 0. Therefore, the prediction unit 63 sets a value of a port number which is associated with a sequence number=1 as Pnx1. In a similar manner, the prediction unit 63 sets a value of a port number which is associated with a sequence number=2 as Pnx2. Accordingly, in the example of FIG. 15, Pnx1=0 and Pnx2=3 are set. The prediction unit 63 notifies the comparison unit 62 and the comparison unit 64 of Pnx1=0 and Pnx2=3 respectively.

It is assumed that a port number for a frame next inputted into the synchronization determination unit 60 is Pin=3. The input port specifying unit 61 notifies each of the comparison unit 62, the prediction unit 63, and the comparison unit 64 of Pin=3. Pin=3 and Pnx1=0 are set, so that the comparison unit 62 determines that Pin is not accorded with Pnx1. Therefore, the comparison unit 62 outputs match_1=NG to the synchronization monitoring unit 65 and the correction unit 70. On the other hand, both Pin and Pnx2 are 3, so that the comparison unit 64 determines that Pin is accorded with Pnx2 and outputs match_2=OK to the prediction unit 63 and the correction unit 70. Since the prediction unit 63 is notified of match_2=OK, the prediction unit 63 does not predict new Pnx1 and Pnx2. At this time, the prediction unit 63 sets an order reverse flag=1.

It is assumed that a port number for a frame inputted third into the synchronization determination unit 60 is Pin=0. Then, the input port specifying unit 61 notifies each of the comparison unit 62, the prediction unit 63, and the comparison unit 64 of Pin=0. Both Pin and Pnx1 are 0, so that the comparison unit 62 determines that Pin=Pnx1 is satisfied. Therefore, the comparison unit 62 outputs match_1=OK to the synchronization monitoring unit 65 and the correction unit 70. On the other hand, Pin=0 and Pnx2=3 are set, so that the comparison unit 64 determines that Pin is not accorded with Pnx2 and outputs match_2=NG to the prediction unit 63 and the correction unit 70. Since the prediction unit 63 obtains match_2=NG, the prediction unit 63 predicts new Pnx1 and Pnx2. At this time, an order reverse flag=1 is satisfied, so that the prediction unit 63 determines that the prediction unit 63 has not notified the comparison unit 62 and the comparison unit 64 of values of Pnx1 and Pnx2 respectively in the previous reception of a frame, due to order reverse of received frames. In a case of the order reverse flag=1, the prediction unit 63 sets a value associated with a sequence number which is the second sequence number after a sequence number of a frame which is received this time, as new Pnx1 and sets a value associated with a sequence number which is the third sequence number after the sequence number of the frame which is received this time, as new Pnx2. The prediction unit 63 estimates that a sequence number of the frame inputted from a port of Pin=0 is 1. Since the prediction unit 63 estimates that Pnx1 is a port number associated with a sequence number=3, the prediction unit 63 notifies the comparison unit 62 of Pnx1=8. In a similar manner, since the prediction unit 63 estimates that Pnx2 is a port number associated with a sequence number=0, the prediction unit 63 notifies the comparison unit 64 of Pnx2=1. Further, the prediction unit 63 sets an order reverse flag to 0.

It is assumed that a port number for a frame inputted fourth into the synchronization determination unit 60 is Pin=8. The input port specifying unit 61 notifies each of the comparison unit 62, the prediction unit 63, and the comparison unit 64 of Pin=8. Both Pin and Pnx1 are 8, so that the comparison unit 62 determines that Pin=Pnx1 is satisfied. The comparison unit 62 outputs match_1=OK to the synchronization monitoring unit 65 and the correction unit 70. On the other hand, Pin=8 and Pnx2=1 are set, so that the comparison unit 64 determines that Pin is not accorded with Pnx2. Then, the comparison unit 64 outputs match_2=NG to the prediction unit 63 and the correction unit 70. Since the prediction unit 63 obtains match_2=NG, the prediction unit 63 predicts new Pnx1 and Pnx2. At this time, an order reverse flag=0 is satisfied, so that the prediction unit 63 sets a value associated with a sequence number which is the next sequence number of a sequence number of a frame which is received this time, as new Pnx1. Further, the prediction unit 63 sets a value associated with a sequence number which is the second sequence number after the sequence number of the frame which is received this time, as new Pnx2.

A method for determining whether synchronization is established on the basis of a determination result which is outputted from the comparison unit 62 is now described. A processing for determining whether synchronization is established is performed in the synchronization monitoring unit 65 and the determination unit 66.

The synchronization monitoring unit 65 acquires a determination result obtained in the determination unit 66. When the determination result in the determination unit 66 is out-of-synchronization, the synchronization monitoring unit 65 counts the number of times of correct prediction (IS_count), on the basis of a comparison result inputted from the comparison unit 62. Then, the synchronization monitoring unit 65 sets the number of times of erroneous prediction (OOS_count) to 0. Regarding a combination of a source address and a destination address of a processing object of the synchronization determination unit 60, the synchronization monitoring unit 65 is set to be in an out-of-synchronization state as an initial value when reception of frames is started. On the other hand, when synchronization is established, the synchronization monitoring unit 65 counts the number of times of erroneous prediction (OOS_count). Then, the synchronization monitoring unit 65 sets the number of times of correct prediction (IS_count) to 0. The synchronization monitoring unit 65 outputs IS_count and OOS_count to the determination unit 66.

The determination unit 66 holds a synchronization establishment determination threshold value Tis and an out-of-synchronization determination threshold value Toos. When a count value of the number of times of correct prediction exceeds the threshold value Tis, the determination unit 66 determines that synchronization is established. That is, the determination unit 66 determines that synchronization is established when a reception port number (Pin) of a frame is accorded with a port number (Pnx1) of a port which is expected to receive a frame in succession over the synchronization establishment determination threshold value, in the out-of-synchronization state. On the other hand, when a count value of the number of erroneous prediction exceeds the threshold value Toos, the determination unit 66 determines that synchronization is not established. That is, the determination unit 66 determines that out-of-synchronization is generated when a reception port number (Pin) of a frame is not accorded with a port number (Pnx1) of a port which is expected to receive a frame in succession to the extent over the out-of-synchronization determination threshold value, in the synchronization established state. The determination unit 66 notifies the synchronization monitoring unit 65 and the correction unit 70 of a determination result.

Figure 16:
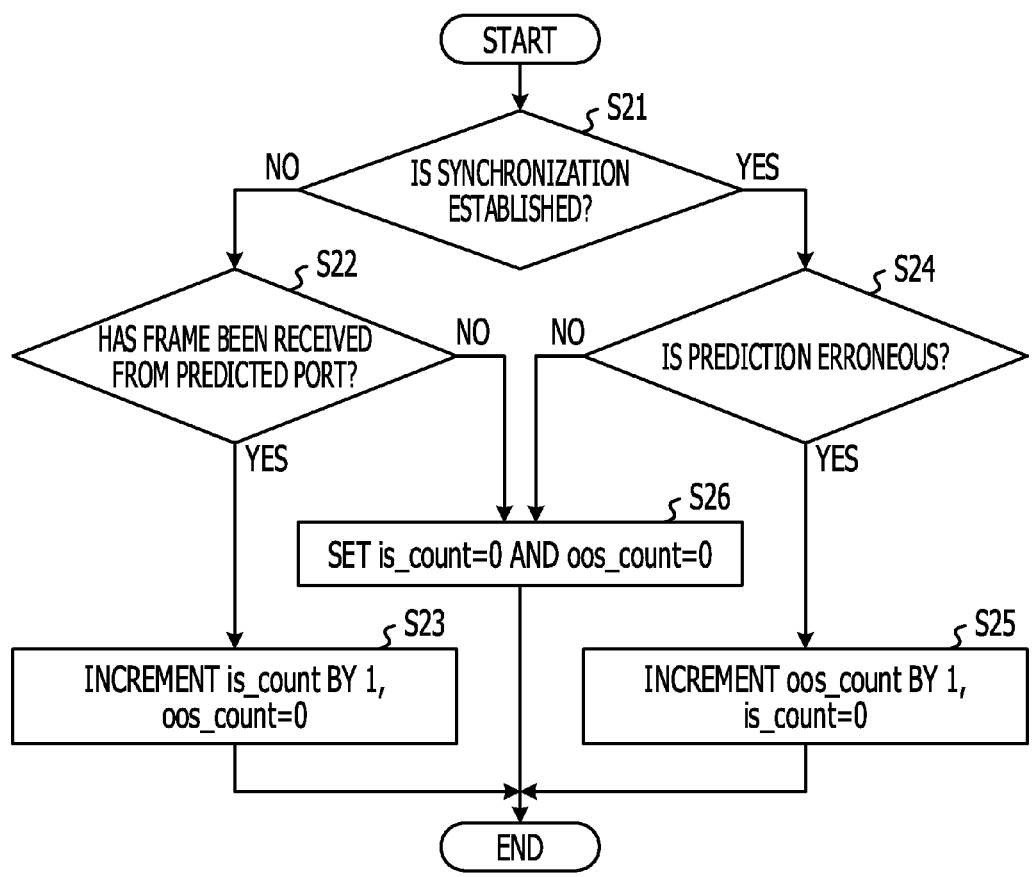
FIG. 16 is a flowchart illustrating an example of an operation of a synchronization monitoring unit.

FIG. 16 is a flowchart illustrating an example of an operation of the synchronization monitoring unit 65. The synchronization monitoring unit 65 determines whether to have been notified of synchronization establishment from the determination unit 66 (S21). When synchronization is not established, the synchronization monitoring unit 65 determines whether to have been notified of success of prediction of a reception port of a frame from the comparison unit 62 (No in S21, S22). When success of prediction of a reception port of a frame is notified from the comparison unit 62, the synchronization monitoring unit 65 increments IS_count by 1 and sets OOS_count to 0 (Yes in S22, S23). When a failure of prediction of a reception port of a frame is notified from the comparison unit 62, the synchronization monitoring unit 65 sets both IS_count and OOS_count to 0 (No in S22, S26). When synchronization is established, the synchronization monitoring unit 65 determines whether to have been notified of a failure of prediction of a reception port of a frame from the comparison unit 62 (Yes in S21, S24). When a failure of prediction of a reception port of a frame is notified from the comparison unit 62, the synchronization monitoring unit 65 increments OOS_count by 1 and sets IS_count to 0 (Yes in S24, S25). When success of prediction of a reception port of a frame is notified from the comparison unit 62, the synchronization monitoring unit 65 sets both IS_count and OOS_count to 0 (No in S24, S26).

Figure 17:
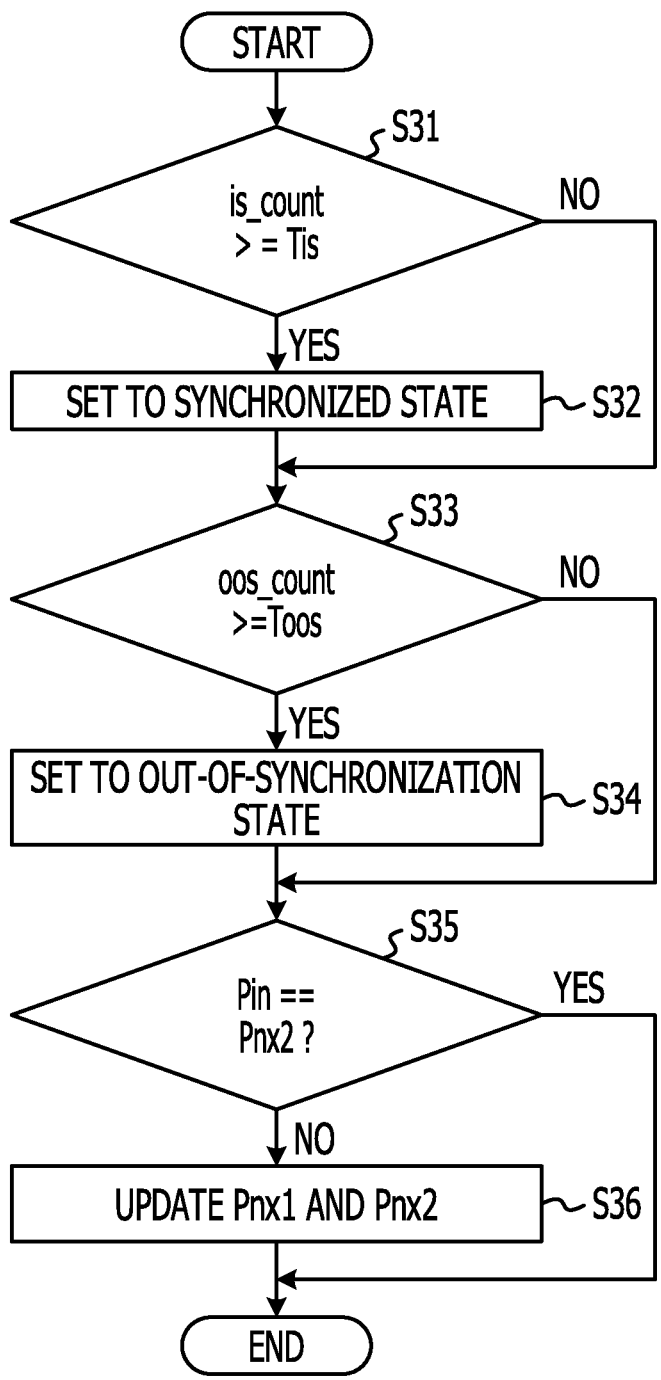
FIG. 17 is a flowchart illustrating an example of a method for determining whether or not synchronization is established.

FIG. 17 is a flowchart illustrating an example of a method for determining whether or not synchronization is established. FIG. 17 illustrates an example of determination in the determination unit 66 and processing in the prediction unit 63. The determination unit 66 determines whether or not a value of IS_count is equal to or larger than the threshold value Tis (S31). When a value of IS_count is equal to or larger than the threshold value Tis, the number of times of continuous correct prediction of port numbers is equal to or larger than the threshold value Tis. Therefore, the determination unit 66 determines that the communication device 10 on the transmission side is synchronized with the communication device 10 on the reception side (Yes in S31). Accordingly, the determination unit 66 shifts the setting to a synchronized state and notifies the synchronization monitoring unit 65 of the setting (S32). Then, the determination unit 66 determines whether or not a value of OOS_count is equal to or larger than the threshold value Toos (S33). When a value of OOS_count is equal to or larger than the threshold value Toos, the number of times of continuous erroneous prediction of a reception port is equal to or larger than the threshold value Toos. Accordingly, the determination unit 66 determines that the communication device 10 on the transmission side is not synchronized with the communication device 10 on the reception side (Yes in S33). The determination unit 66 shifts the setting to an out-of-synchronization state and notifies the synchronization monitoring unit 65 of the setting (S34).

The prediction unit 63 determines whether to have been notified that Pin and Pnx2 are equal to each other from the comparison unit 64 (S35). Here, equality of Pin and Pnx2 represents that an occurrence of order reverse has been observed. Therefore, when the prediction unit 63 has not been notified that Pin and Pnx2 are equal to each other from the comparison unit 64, the prediction unit 63 updates values of Pnx1 and Pnx2 (No in S35, S36). On the other hand, when the prediction unit 63 has been notified that Pin and Pnx2 are equal to each other from the comparison unit 64, the prediction unit 63 ends the processing without updating values of Pxn1 and Pnx2 (Yes in S35).

Figure 18:
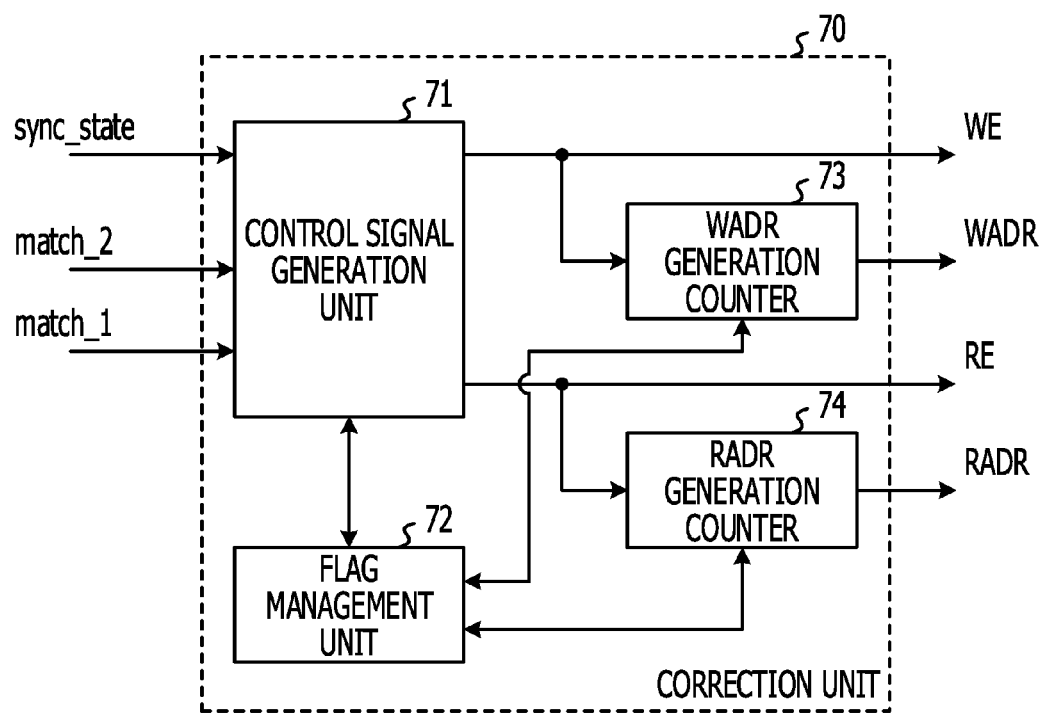
FIG. 18 illustrates an example of a correction unit.

FIG. 18 illustrates an example of the correction unit 70. The correction unit 70 includes a control signal generation unit 71, a flag management unit 72, a write address (WADR) generation counter 73, and a read address (RADR) generation counter 74. The control signal generation unit 71 acquires match_1, match_2, and a determination result of a synchronization state from the comparison unit 62, the comparison unit 64, and the determination unit 66 respectively. The control signal generation unit 71 generates signals for controlling writing into the frame buffer 80 and reading from the frame buffer 80, by using information acquired from the comparison unit 62, the comparison unit 64, and the determination unit 66. As depicted in FIG. 13, a frame is inputted into the frame buffer 80 from the distribution unit 51. The frame buffer 80 stores information inputted at timing at which a signal for permitting writing is inputted from the control signal generation unit 71. When reading is requested by the control signal generation unit 71, the frame buffer 80 outputs a frame to the switch 40. Accordingly, selection of a frame to be outputted to the switch 40 is performed on the basis of a signal outputted from the control signal generation unit 71. Hereinafter, a signal for permitting writing into the frame buffer 80 is referred to as a "writing enabling signal" or "write enable (WE)". On the other hand, a signal for controlling reading from the frame buffer 80 is referred to as a "reading enabling signal" or "read enable (RE)". The control signal generation unit 71 outputs a writing enabling signal to the frame buffer 80 and the WADR generation counter 73.

The control signal generation unit 71 requests the WADR generation counter 73 to generate a signal for specifying an address into which writing is performed, by outputting a writing enabling signal to the WADR generation counter 73. The WADR generation counter 73 generates a signal for specifying an address into which writing is performed (writing address signal). Then, the WADR generation counter 73 outputs the writing address signal to the frame buffer 80. At this time, the WADR generation counter 73 is capable of determining whether or not frames are stored in the frame buffer 80 by accessing the flag management unit 72. When frames are stored in the frame buffer 80, the WADR generation counter 73 adjusts a writing address so that a new frame is written in a region different from a region in which a frame has been already stored. The control signal generation unit 71 requests the RADR generation counter 74 to generate a signal for specifying an address from which reading is performed, by outputting a reading enabling signal to the RADR generation counter 74. The RADR generation counter 74 generates a signal for specifying an address from which reading is performed (reading address signal) and outputs the reading address signal to the frame buffer 80.

The flag management unit 72 manages a flag for specifying whether or not a frame is stored in the frame buffer 80. Hereinafter, a flag for specifying whether or not a frame is stored in the frame buffer 80 may be referred to as a "storage flag". A storage flag=1 represents that a frame is stored in the frame buffer 80. A storage flag=0 represents that no frame is stored in the frame buffer 80.

FIG. 19 is a table illustrating an example of processing performed by using the correction unit 70 and the frame buffer 80. In FIG. 19, d.c. is an abbreviation of "don't care" and represents an arbitrary value. In FIG. 19 and the like, a synchronized state is denoted as sync_state. sync_state=IS represents that synchronization is established between the transmission side and the reception side and sync_state=OOS represents that synchronization is not established between the transmission side and the reception side.

When being notified of out-of-synchronization from the determination unit 66, the control signal generation unit 71 decides to discard an inputted frame irrespective of information received from the comparison unit 62 and the comparison unit 64 and a value of a storage flag. Accordingly, the control signal generation unit 71 does not output either a writing enabling signal or a reading enabling signal during the out-of-synchronization. Therefore, frames which are inputted into the frame buffer 80 during the out-of-synchronization are not stored in the frame buffer 80 and are not outputted to the switch 40, thereby being discarded.

When being notified of a synchronization establishment from the determination unit 66 and notified that prediction of a reception port number is correct from the comparison unit 62, the control signal generation unit 71 determines whether or not a frame is stored in the frame buffer 80. When no frame is stored in the frame buffer 80 (storage flag=0), the control signal generation unit 71 decides to output an inputted frame to the switch 40. Therefore, the control signal generation unit 71 outputs both a writing enabling signal and a reading enabling signal. A writing address and a reading address specified by the WADR generation counter 73 and the RADR generation counter 74 respectively are adjusted so that a frame which is written in the frame buffer 80 is read by the switch 40. Therefore, a frame inputted into the frame buffer 80 from the distribution unit 51 is read by the switch 40 while being written in the frame buffer 80.

On the other hand, when a frame is stored in the frame buffer 80 (storage flag=1), the control signal generation unit 71 decides to output the frame which is stored in the frame buffer 80 to the switch 40 after outputting an inputted frame to the switch 40. Accordingly, the control signal generation unit 71 outputs both a writing enabling signal and a reading enabling signal. At this time, the WADR generation counter 73 sets a writing address so that a frame to be inputted into the frame buffer 80 is written after a frame which has been already written in the frame buffer 80. The RADR generation counter 74 sets a reading address so that a frame which has been written in the frame buffer 80 is first read out. Therefore, a frame which is inputted into the frame buffer 80 from the distribution unit 51 is outputted to the switch 40 and a frame which is stored in the frame buffer 80 is maintained as it is. When reading of a frame inputted from the distribution unit 51 is finished, a frame held by the frame buffer 80 is outputted to the switch 40.

When a synchronization establishment is notified from the determination unit 66 and correct prediction of a reception port number (match_2=OK) is notified from the comparison unit 64, order reverse has occurred. Therefore, the control signal generation unit 71 decides to write a received frame into the frame buffer 80 so as to correct the order reverse. Accordingly, the control signal generation unit 71 outputs a writing enabling signal to the frame buffer 80.

FIGS. 20 to 23 illustrate examples of timing charts. An example of timing of a signal for each case illustrated in FIG. 19 is described below with reference to FIGS. 20 to 23.

Figure 20:
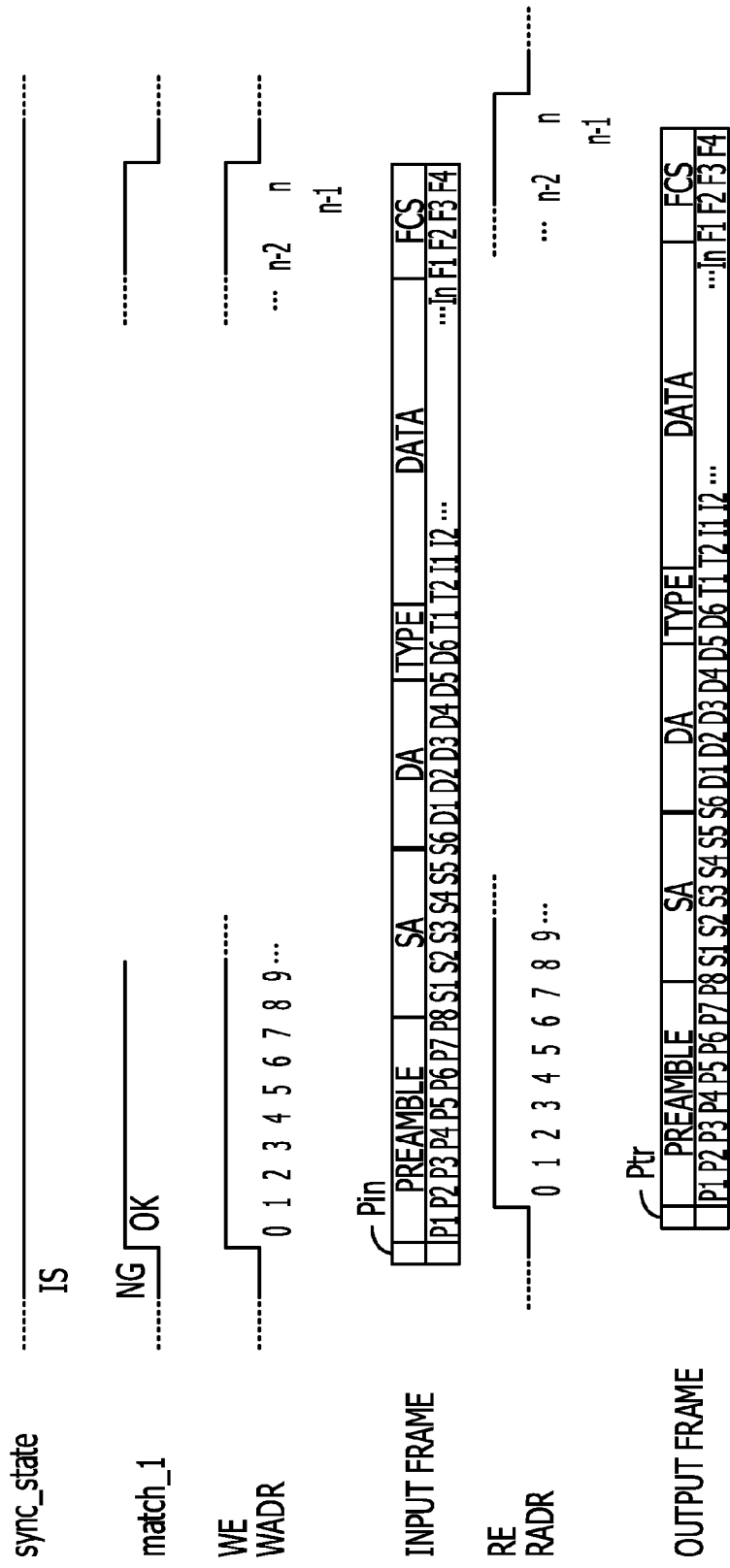
FIG. 20 illustrates an example of a timing chart.

FIG. 20 illustrates an example of a timing chart of a case in which synchronization is established between the communication device 10a and the communication device 10b and order reverse of frames has not occurred. In the case of FIG. 20, it is assumed that no frame is stored in the frame buffer 80 (storage flag=0).

In the case illustrated in FIG. 20, the determination unit 66 has determined that synchronization is established between the transmission side and the reception side, on the basis of results of transmission/reception of frames up to the previous time. Therefore, the determination unit 66 outputs sync_state=IS to the control signal generation unit 71. It is assumed that timing at which a frame is inputted from the distribution unit 51 into the synchronization determination unit 60 and the frame buffer 80 is as illustrated in a field of an input frame of FIG. 20. The first byte of an input frame is processed by the input port specifying unit 61 and the comparison unit 62 so as to determine whether or not prediction of a reception port is correct. In the example of FIG. 20, prediction of a reception port is correct, so that the comparison unit 62 outputs a signal of match_1=OK to the control signal generation unit 71. The comparison unit 62 continues outputting match_1=OK to the control signal generation unit 71 until a tail end of a frame of which a reception port is correctly predicted passes through the comparison unit 62. Therefore, match_1=OK is outputted to the control signal generation unit 71 while the second byte to the last 1 byte of the input frame are inputted into the frame buffer 80.

When control signals of sync_state=IS and match_1=OK are inputted, the control signal generation unit 71 outputs a writing enabling signal to the frame buffer 80 in time for writing of the second byte of the input frame. While match_1=OK is inputted, the control signal generation unit 71 continues outputting a writing enabling signal to the frame buffer 80. Further, the control signal generation unit 71 requests the WADR generation counter 73 to generate a writing address signal. When determining that no frame is stored in the frame buffer 80, the WADR generation counter 73 counts up writing addresses by 1 byte at a time from 0. Therefore, frames which are inputted into the frame buffer 80 are stored from an address 0 to an address n of the frame buffer 80.

The control signal generation unit 71 accesses the flag management unit 72 so as to specify a value of a storage flag. In this case, the storage flag=0 is satisfied, so that the control signal generation unit 71 decides to read out a frame which has been written in the frame buffer 80 to the switch 40. Therefore, the control signal generation unit 71 outputs a reading enabling signal to the frame buffer 80 and the RADR generation counter 74 at timing delayed from the timing of writing. In the example of FIG. 20, a reading enabling signal is outputted at timing delayed by time of processing of 1 byte compared to timing of a writing enabling signal. When the reading enabling signal is inputted, the RADR generation counter 74 outputs a reading address signal to the frame buffer 80. At this time, the RADR generation counter 74 counts up reading addresses by 1 byte at a time from 0.

Further, the control signal generation unit 71 outputs a control signal to the port designation unit 85 so that information for designating a number of port, which is used for output from the switch 40, on the line side is added to the first 1 byte of a frame which is read out. In the case of FIG. 20, the control signal generation unit 71 outputs a control signal to the port designation unit 85 at approximately the same timing as timing of the writing enabling signal. Accordingly, the port designation unit 85 outputs a port number Ptr to the switch 40. A frame is read from the frame buffer 80 in accordance with the control signal from the control signal generation unit 71 and the RADR generation counter 74 and a frame which is read out sequentially to the port number Ptr is outputted to the switch 40. Therefore, a frame which is outputted to the switch 40 is as illustrated in an output frame of FIG. 20.

Figure 21:
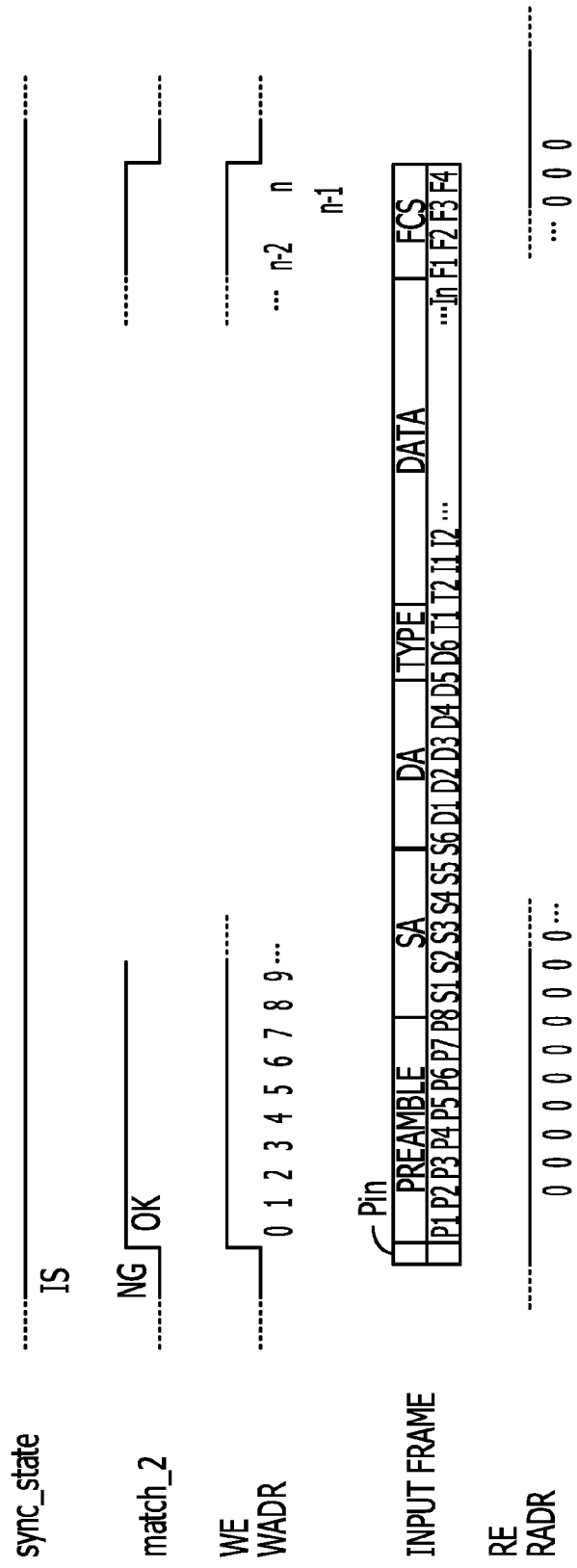
FIG. 21 illustrates an example of a timing chart.

FIG. 21 illustrates an example of a timing chart of a case in which synchronization is established between the communication device 10a and the communication device 10b and order reverse of frames has occurred. FIG. 21 illustrates an example of processing of a case in which a frame after the next frame of the last received frame is inputted. In the case of FIG. 21 as well, it is assumed that no frame is stored in the frame buffer 80 (storage flag=0).

In the case illustrated in FIG. 21, synchronization is established, so that the determination unit 66 outputs sync_state=IS to the control signal generation unit 71. It is assumed that timing at which a frame is inputted from the distribution unit 51 into the synchronization determination unit 60 and the frame buffer 80 is as illustrated in a field of an input frame of FIG. 21. It is assumed that the first byte of an input frame is processed by the input port specifying unit 61, the comparison unit 62, and the comparison unit 64 and consequently, it is determined that a frame after the next frame of the last received frame is received. Accordingly, the comparison unit 62 and the comparison unit 64 output a signal of match_1=NG and a signal of match_2=OK respectively to the control signal generation unit 71. Here, the comparison unit 64 continues outputting match_2=OK to the control signal generation unit 71 until a tail end of a frame which is determined as a frame after the next frame of the last received frame passes through the comparison unit 64.

When control signals of sync_state=IS and match_2=OK are inputted, the control signal generation unit 71 outputs a writing enabling signal to the frame buffer 80 in time for writing of the second byte of the input frame. While match_2=OK is inputted, the control signal generation unit 71 continues outputting a writing enabling signal to the frame buffer 80. Further, the control signal generation unit 71 requests the WADR generation counter 73 to generate a writing address signal. When determining that no frame is stored in the frame buffer 80, the WADR generation counter 73 notifies the frame buffer 80 of an input address while counting up writing addresses by 1 byte at a time from 0. Therefore, frames are stored from an address 0 to an address n of the frame buffer 80.

Due to match_1=NG, the control signal generation unit 71 does not output a reading enabling signal. Therefore, a frame which has been written in the frame buffer 80 is stored without being read out.

Figure 22:
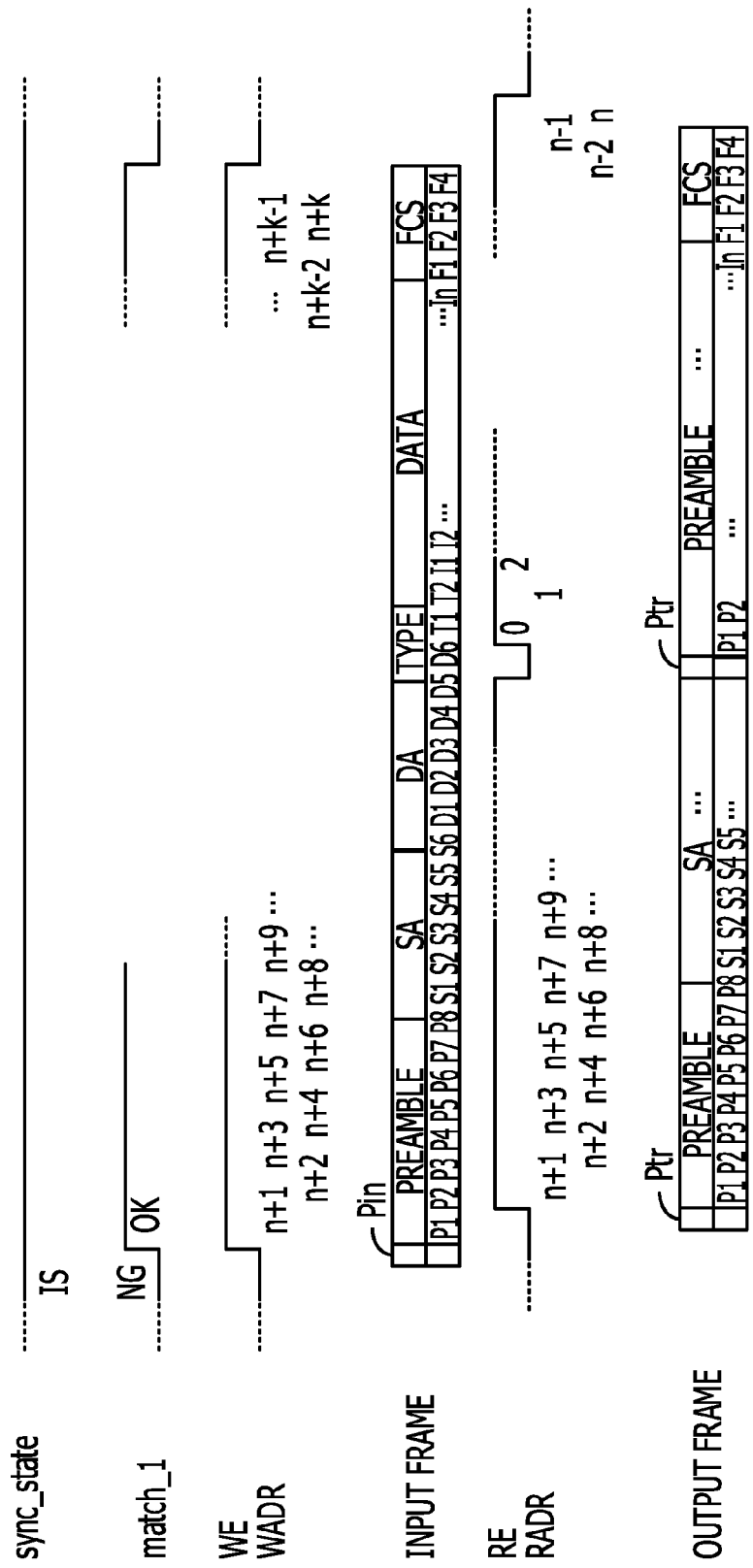
FIG. 22 illustrates an example of a timing chart.

FIG. 22 illustrates an example of processing which is performed in a case in which a frame which is transmitted one frame before a frame which is stored in the frame buffer 80 is received after execution of the processing which has been described with reference to FIG. 21. In FIG. 22, sync_state, match_1, a writing enabling signal, and an input frame are depicted with the same horizontal axes representing time and are depicted in a different temporal sequence from a reading enabling signal and an output frame. On the other hand, a reading enabling signal and an output frame are depicted such that intermediate parts of time axes thereof are omitted so as to clearly illustrate an adjustment method of order reverse of frames. A frame which is outputted up until a second Ptr of an output frame is an input frame. Frames on and after the second Ptr are frames which have been stored in the frame buffer 80.

In the case of FIG. 22 as well, whether or not prediction of a reception port is correct is determined in a procedure similar to the procedure which has been described with reference to FIG. 20. Here, order reverse has occurred in the processing of FIG. 21, so that Pnx1 has not been updated as illustrated in S35 of FIG. 17. Therefore, the comparison unit 62 determines that prediction of a reception port is correct and outputs a signal of match_1=OK to the control signal generation unit 71.

Since control signals of sync_state=IS and match_1=OK are inputted, the control signal generation unit 71 outputs a writing enabling signal to the frame buffer 80 and the WADR generation counter 73 in time for writing of the second byte of an input frame. When the WADR generation counter 73 determines that a frame is stored in the frame buffer 80 on the basis of a storage flag=1, the WADR generation counter 73 specifies an address on which writing may be started. In the example of FIG. 21, addresses 0 to n of the frame buffer 80 have been used. Therefore, the WADR generation counter 73 designates addresses on and after an address n+1 as addresses for writing newly-received frames. In the example of FIG. 22, new frames are written in addresses n+1 to n+k.

The control signal generation unit 71 decides to read a frame which has been written in the frame buffer 80 to the switch 40. Accordingly, the control signal generation unit 71 outputs a reading enabling signal to the frame buffer 80 and the RADR generation counter 74 at timing delayed compared to timing of writing. The RADR generation counter 74 accesses the flag management unit 72 to specify the storage flag=1. Then, the RADR generation counter 74 specifies an address of a head of a memory in which a frame to be read first is stored. In the example of FIG. 22, new frames are recorded on and after the address n+1. Therefore, the RADR generation counter 74 outputs a reading address signal of which reading objects are addresses on and after the address n+1, to the frame buffer 80.

Here, in the case of FIG. 22 as well, a port number Ptr is added to the head of a frame by a procedure similar to the procedure which has been described with reference to FIG. 20. Further, when finishing reading of newly-received frames, the control signal generation unit 71 requests the port designation unit 85 to insert the port number Ptr again. When the port designation unit 85 outputs the port number to the switch 40, the control signal generation unit 71 resumes output of a reading enabling signal on the frame buffer 80 and the RADR generation counter 74. With respect to a reading enabling signal which is outputted on the second time, a frame which has been stored in the frame buffer 80 is outputted to the switch 40. Therefore, the RADR generation counter 74 counts up reading addresses by 1 byte at a time from an address 0 so as to generate a reading address signal.

Figure 23:
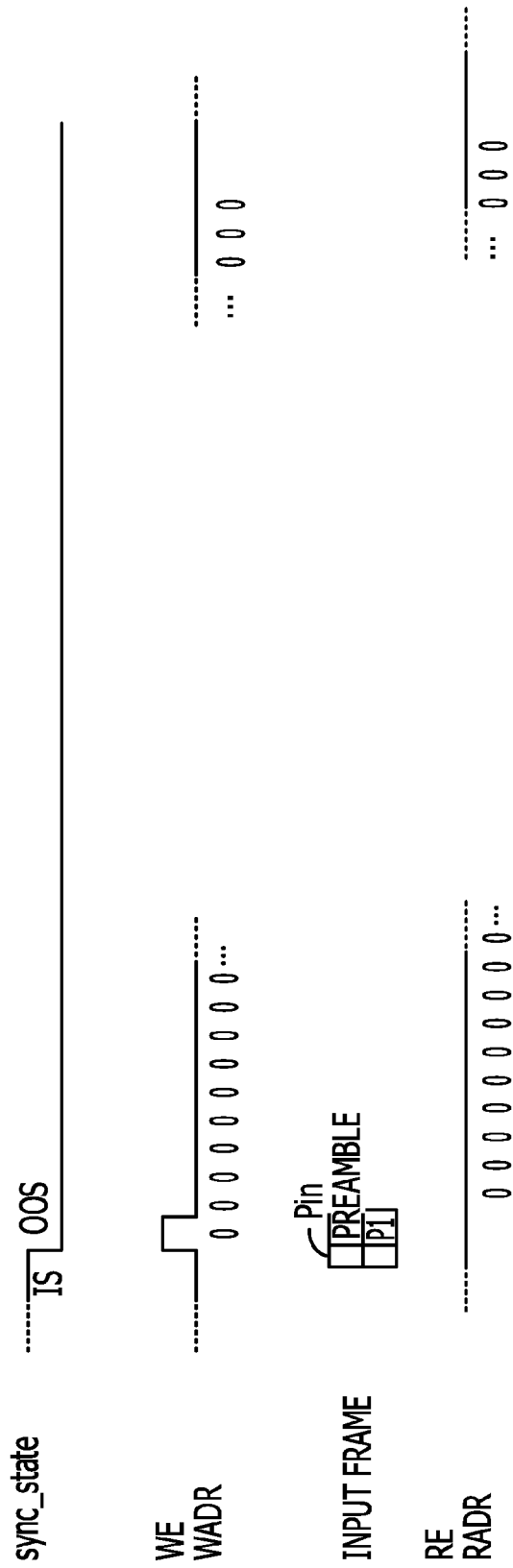
FIG. 23 illustrates an example of a timing chart.

FIG. 23 is a timing chart illustrating an example of an operation of a case in which the communication device 10a on the transmission side is not synchronized with the communication device 10b on the reception side. The determination unit 66 has determined that synchronization is not established between the transmission side and the reception side, on the basis of a result of transmission/reception of frames up until the preceding time. Therefore, the determination unit 66 outputs sync_state=OOS to the control signal generation unit 71.

The control signal generation unit 71 outputs a writing enabling signal in time for writing of the second byte of an input frame. However, when determining that sync_state=OOS is satisfied, the control signal generation unit 71 ceases output of a writing enabling signal. In the example of FIG. 23, a writing enabling signal is outputted before determination of whether or not sync_state=OOS is satisfied is finished, in time for writing of the second byte of the input frame. Therefore, the first 1 byte of the input frame is written in the frame buffer 80. However, the following writing is interrupted, so that a storage flag is set to 0. Therefore, when a new frame is read after synchronization is established, an address on which a frame received during sync_state=OOS is recorded is used for recording of the new frame, thus being rewritten. When sync_state=OOS is satisfied, the control signal generation unit 71 does not output a reading enabling signal either. Therefore, frames which have been received up until synchronization is established are discarded.

Figure 24:
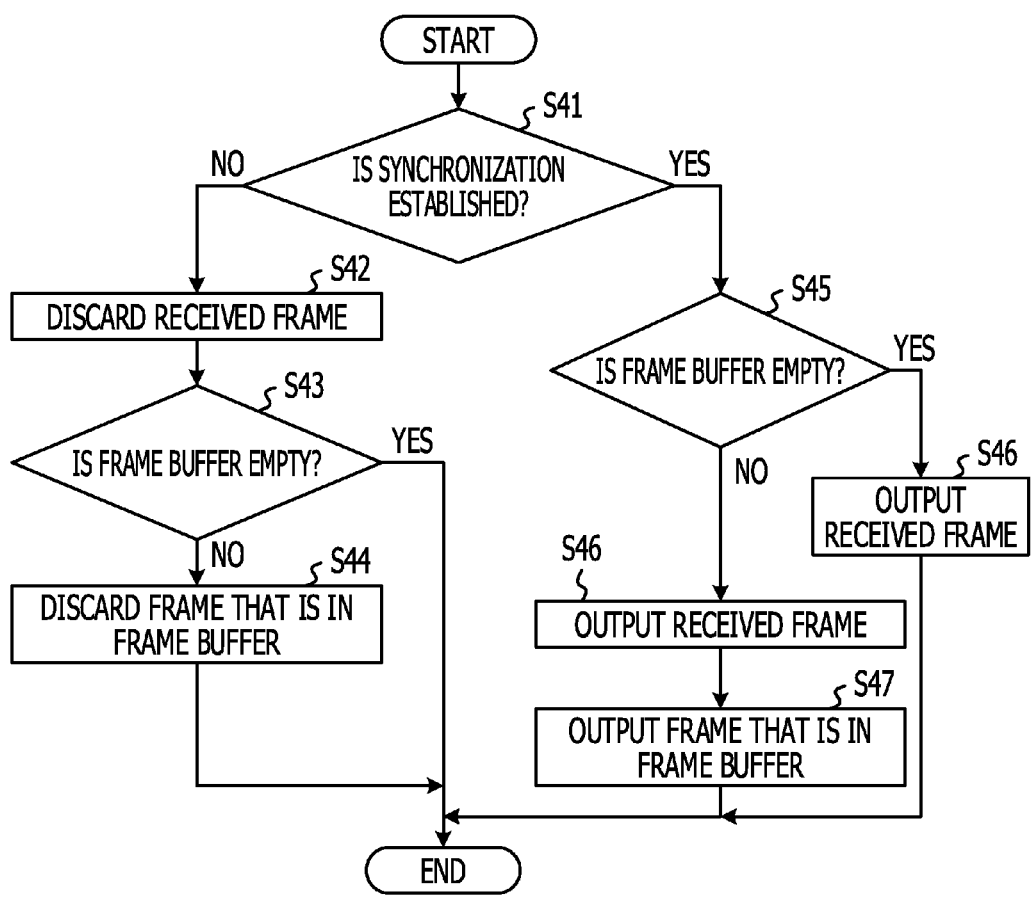
FIG. 24 is a flowchart illustrating an example of processing which is performed in the correction unit.

FIG. 24 is a flowchart illustrating an example of processing which is performed in the correction unit 70. The control signal generation unit 71 determines whether or not synchronization is established between the communication device 10 on the transmission side and the communication device 10 on the reception side (S41). While synchronization is not established, it is difficult to rearrange received frames in accordance with a transmission order of the frames in the communication device 10 on the reception side. Therefore, the control signal generation unit 71 does not generate either a writing enabling signal or a reading enabling signal so as to discard frames which are received while synchronization is not established (No in S41, S42). The control signal generation unit 71 accesses the flag management unit 72 so as to determine whether or not a frame is stored in the frame buffer 80 (S43). When the frame buffer 80 is empty, the correction unit 70 ends the processing (Yes in S43). On the other hand, when a frame is stored in the frame buffer 80, the frame in the frame buffer 80 is discarded (No in S43, S44).

When synchronization is established, received frames may be rearranged in accordance with the transmission order of the frames in the communication device 10 on the reception side. Therefore, the correction unit 70 performs processing for outputting a received frame to the switch 40. The control signal generation unit 71 accesses the flag management unit 72 so as to determine whether or not the frame buffer 80 is empty (Yes in S41, S45). A case in which a frame is stored in the frame buffer 80 represents that order reverse has occurred (No in S45). Therefore, after outputting a received frame to the switch 40, the control signal generation unit 71 outputs a frame which is stored in the frame buffer 80 (S46, S47). On the other hand, when the frame buffer 80 is empty and order reverse has not occurred, the control signal generation unit 71 outputs a received frame to the switch 40 (Yes in S45, S48).

The switch 40 acquires a frame of a format depicted in FIG. 5D from the order correction unit 52. The switch 40 outputs the received frame to a port on the line side of which a port number is accorded with a value of the first 1 byte of the frame. Therefore, the received frame is inputted into the interface circuit 20 which is coupled to a port which is designated by a value of the first 1 byte of the frame. The interface circuit 20 deletes the first 1 byte of the inputted frame so as to convert the inputted frame into a frame (FIG. 5A) which is transmitted to a terminal by the device on the source. The interface circuit 20 transmits the converted frame from the transmission/reception unit 21 to the terminal.

Thus, according to the communication device 10 of the embodiment, the communication device 10 on the reception side is capable of estimating a transmission order of received frames by using a number of a port through which the received frame is inputted, a source address, and a destination address. In other words, the communication device 10 on the reception side is capable of correcting order reverse even if the order of frames which are transmitted from the communication device 10 on the transmission side is reversed. Accordingly, the communication device 10 on the transmission side is capable of transmitting a plurality of frames having the same combinations of a source and a destination, to the communication device 10 on the reception side by using different physical links 11. Accordingly, the communication device 10 is capable of relaying communication which is performed in a bandwidth exceeding a band of the physical link 11.

Further, frames which are transmitted/received between the communication devices 10 do not include sequence numbers (cyclic numbers) for specifying an order of frames which are transmitted/received through a plurality of physical links 11. Therefore, it is possible to relay communication of a bandwidth equal to or larger than that of a physical link without changing a format of a frame which is used for transmission/reception among terminals.

Embodiments are not limited to the above-described embodiment but may be variously modified. Examples of modification are described below.

The case in which the MD5 is used as a hash function is taken as an example in the above description, but an algorithm of a hash function may be arbitrarily changed depending on implementation. For example, a cyclic redundancy code (CRC32), a secure hash algorithm (SHA-1), and the like may be used instead of the MD5.

The arrows in the drawings represent a flow of a part of information which is a processing object such as a received frame and a transmitted frame, for example. Accordingly, there is also information which is outputted in a direction opposite to the arrows in the drawings, such as a control signal. For example, the WADR generation counter 73 and the RADR generation counter 74 may input information into the control signal generation unit 71, in FIG. 18.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication method using link aggregation, the communication method comprising:
   receiving a transfer frame;
   calculating, by a first communication device, an identification number of an output port for the transfer frame among a plurality of ports using a hash function, by using a combination of a source address of the transfer frame, a destination address of the transfer frame, and a cyclic number that is generated for every combination of the source address and the destination address and represents an order of the transfer frame as a hash key; and
   transmitting the transfer frame from the output port,
   wherein the receiving and the transmitting are performed by the first communication device, and the communication method further comprising:
   associating, by a second communication device that receives the transfer frame from the first communication device, a reception port number of a reception port that receives the transfer frame with the transfer frame;

predicting the order of the transfer frame based on a combination of the source address, the destination address, and the reception port number;

correcting the order of the transfer frame to a predicted order when the order is not correct; and transmitting the transfer frame to a transfer destination in accordance with the predicted order.

2. The communication method according to claim 1, wherein the calculating the identification number includes
setting a first remainder that is obtained by dividing a value obtained by the calculation using the hash function by a total number of the plurality of ports as the identification number.

3. The communication method according to claim 2, wherein the performing calculation using the hash function includes generating a sequence in which the destination address, the source address, and the cyclic number are linked in this order.

4. The communication method according to claim 2, wherein the second communication device is configured to:
obtain a second remainder by dividing a hash value based on the combination of the source address, the destination address, and the cyclic number and the hash function, by the total number of the plurality of ports;
associate the cyclic number with the reception port number so that the second remainder is accorded with the reception port number,
predict a first value that is a value of a cyclic number that is associated with a first transfer frame, based on a first reception port number that is a number of a port that receives the first transfer frame,
predict a second value that is a cyclic number that is assigned to a second transfer frame that is transmitted from the second communication device after the first transfer frame, and
set a frame that is received from a port that is identified based on a second reception port number that is associated with the second value, as the second transfer frame.

5. The communication method according to claim 4, wherein the second communication device is configured to:
predict a third value that is a cyclic number that is assigned to a third transfer frame that is transmitted from the first communication device after a next transfer frame of the first transfer frame,
set a frame that is received from a port that is identified based on a third reception port number that is associated with the third value, as a third transfer frame that is transmitted from the second communication device after the second transfer frame, and
hold the third transfer frame until transmission of the second transfer frame to the communication destination is ended, when receiving the third transfer frame from a port that is identified based on the third reception port number before receiving the second transfer frame from a port that is identified based on the second reception port number.

6. The communication method according to claim 1, wherein the plurality of ports are link aggregated as a single line.

7. The communication method according to claim 1, wherein the cyclic number circulates in a predetermined value range.

8. The communication method according to claim 1, further comprising:
determining whether the first communication device is synchronized with the second communication device; wherein the determining is performed by the second communication device, and
the correcting the order of the transfer frame is executed when the second communication device determines that the first communication device is synchronized with the second communication device.

9. A communication system, comprising:
a first communication device configured to:
receive a transfer frame,
calculate an identification number of an output port for the transfer frame among a plurality of ports using a hash function, by using a combination of a source address of the transfer frame, a destination address of the transfer frame, and a cyclic number that represents an order of the transfer frame for every combination of the source address and the destination address and represents an order of the transfer frame as a hash key, and
transmit the transfer frame from the output port; and
a second communication device configured to:
receive the transfer frame from the first communication device,
associate a reception port number of a reception port that receives the transfer frame with the transfer frame,
predict the order of the transfer frame based on a combination of the source address, the destination address, and the reception port number,
correct the order of the transfer frame to a predicted order when the order is not correct, and
transmit the transfer frame to a transfer destination in accordance with the predicted order.

10. The communication system according to claim 9, wherein the first communication device is configured to
set a first remainder that is obtained by dividing a value obtained by the calculation using the hash function by a total number of the plurality of ports as the identification number.

11. The communication system according to claim 10, wherein the first communication device is configured to
generate, by the calculation using the hash function, a sequence in which the destination address, the source address, and the cyclic number are linked in this order.

12. The communication system according to claim 10, wherein the second communication device is configured to:
obtain a second remainder by dividing a hash value based on the combination of the source address, the destination address, and the cyclic number and the hash function, by the total number of the plurality of ports;
associate the cyclic number with the reception port number so that the second remainder is accorded with the reception port number,
predict a first value that is a value of a cyclic number that is associated with a first transfer frame, based on a first reception port number that is a number of a port that receives the first transfer frame,
predict a second value that is a cyclic number that is assigned to a second transfer frame that is transmitted from the second communication device after the first transfer frame, and
set a frame that is received from a port that is identified based on a second reception port number that is associated with the second value, as the second transfer frame.

13. The communication system according to claim 12, wherein the second communication device is configured to:

predict a third value that is a cyclic number that is assigned to a third transfer frame that is transmitted from the first communication device after a next transfer frame of the first transfer frame, set a frame that is received from a port that is identified based on a third reception port number that is associated with the third value, as a third transfer frame that is transmitted from the second communication device after the second transfer frame, and hold the third transfer frame until transmission of the second transfer frame to the communication destination is ended, when receiving the third transfer frame from a port that is identified based on the third reception port number before receiving the second transfer frame from a port that is identified based on the second reception port number.

14. The communication system according to claim 9, wherein the plurality of ports are link aggregated as a single line.

15. The communication system according to claim 9, wherein the cyclic number circulates in a predetermined value range.

16. The communication system according to claim 9, wherein the second communication device is configured to:
determine whether the first communication device is synchronized with the second communication device; and
correct the order of the transfer frame when it is determined that the first communication device is synchronized with the second communication device.

* * * * *